(12) United States Patent
Chung et al.

(10) Patent No.: US 12,486,943 B2
(45) Date of Patent: Dec. 2, 2025

(54) ORGANIZATIONAL SYSTEMS AND COMPONENTS

(71) Applicant: CANADIAN TIRE CORPORATION, LIMITED, Toronto (CA)

(72) Inventors: Hyung Joon Chung, Toronto (CA); John Paul Schmider, Scarborough (CA); Heather Chi-Ying Lam, Hamilton (CA); Abdul Haleem Ahamed Koya, Oakville (CA); Joseph Jerome Spalding, Elyria, OH (US); Gabriel Jose Puerto, Bay Village, OH (US); Jonathan Barrett Morgan, Westlake, OH (US); Nicholas Randolph Dauchot, Columbus, OH (US); Michael Christopher Tracz, Brecksville, OH (US); Michael James Fuina, King City (CA)

(73) Assignee: Canadian Tire Corporation, Limited, Toronto (CA)

( * ) Notice: Subject to any disclaimer, the term of this patent is extended or adjusted under 35 U.S.C. 154(b) by 778 days.

(21) Appl. No.: 17/615,825

(22) PCT Filed: Oct. 30, 2020

(86) PCT No.: PCT/CA2020/051468
§ 371 (c)(1),
(2) Date: Dec. 1, 2021

(87) PCT Pub. No.: WO2021/217234
PCT Pub. Date: Nov. 4, 2021

(65) Prior Publication Data
US 2022/0349520 A1     Nov. 3, 2022

Related U.S. Application Data

(60) Provisional application No. 63/017,285, filed on Apr. 29, 2020.

(51) Int. Cl.
*F16M 13/02*     (2006.01)
*A47B 95/00*     (2006.01)
(Continued)

(52) U.S. Cl.
CPC .......... *F16M 13/022* (2013.01); *A47B 95/00* (2013.01); *F16B 2/005* (2013.01); *F16B 2/06* (2013.01)

(58) Field of Classification Search
CPC ....... F16M 13/022; A47B 95/00; F16B 2/005; F16B 2/06
See application file for complete search history.

(56) References Cited

U.S. PATENT DOCUMENTS

| | | | | |
|---|---|---|---|---|
| 1,106,096 | A | * | 8/1914 | Hunt ....................... B25B 1/125 269/182 |
| 1,549,567 | A | * | 8/1925 | Baldwin ................. B25B 5/101 269/221 |

(Continued)

FOREIGN PATENT DOCUMENTS

| | | |
|---|---|---|
| CA | 2751415 | 8/2010 |
| CN | 107810358 A | 3/2018 |

(Continued)

OTHER PUBLICATIONS

International Searching Authority, International Search Report, PCT Application No. PCT/CA2020/051468, dated Jan. 19, 2021, CA.

(Continued)

*Primary Examiner* — Stanton L Krycinski
(74) *Attorney, Agent, or Firm* — Reichel Stohry Dean LLP; Natalie J. Dean

(57) ABSTRACT

Organizational systems and associated components and methods for garages, sheds, basements or other spaces that have exposed wall or ceiling elongated members are provided. One such component includes a bracket having a first (Continued)

wall, a second wall facing the first wall and spaced apart from the first wall, and a third wall interconnecting the first and second walls. The first, second and third walls cooperatively define a channel for receiving the elongated member. The bracket includes an interface for releasable attachment of a storage component to the bracket. A clamp foot is movably coupled to the first wall. The clamp foot is translatable between an engaged position and a released position to respectively engage and release the elongated member received in the channel.

12 Claims, 36 Drawing Sheets

(51) Int. Cl.
*F16B 2/00* (2006.01)
*F16B 2/06* (2006.01)

(56) References Cited

U.S. PATENT DOCUMENTS

| | | | | |
|---|---|---|---|---|
| 1,828,370 | A | | 10/1931 | Huddle |
| 2,322,107 | A | * | 6/1943 | Balcar ............... B25B 5/101 269/224 |
| 2,576,069 | A | | 11/1951 | Hoag et al. |
| 2,867,003 | A | * | 1/1959 | Stiles ............... B29C 33/202 249/82 |
| 3,907,113 | A | * | 9/1975 | Kropelnitski ............ B62H 3/12 414/227 |
| 3,942,337 | A | | 3/1976 | Leonard et al. |
| 3,993,002 | A | * | 11/1976 | Stroh ................. A47F 5/13 211/90.03 |
| 4,062,203 | A | | 12/1977 | Leonard et al. |
| 4,747,590 | A | * | 5/1988 | Yang ............... B25B 5/003 269/45 |
| 4,787,613 | A | * | 11/1988 | Hayes ............... B25B 5/006 269/72 |
| 4,844,387 | A | * | 7/1989 | Sorgi ............... F16M 13/00 108/5 |
| 4,844,397 | A | * | 7/1989 | Skakoon ............. F16B 41/005 248/231.71 |
| 4,869,378 | A | * | 9/1989 | Miller ............... F16M 13/00 248/225.11 |
| 4,903,929 | A | | 2/1990 | Hoffman |
| 5,069,408 | A | * | 12/1991 | Bessinger ............. A47B 96/061 211/187 |
| 5,110,080 | A | * | 5/1992 | Rieman ............. A47B 96/1408 248/225.11 |
| 5,312,097 | A | * | 5/1994 | Womack ............... B25B 5/101 269/221 |
| 5,332,108 | A | * | 7/1994 | Blass ............... A47F 5/0846 211/90.02 |
| 5,472,103 | A | * | 12/1995 | Merl ............... A47B 47/022 211/187 |
| 5,509,541 | A | * | 4/1996 | Merl ............... A47B 57/42 211/208 |
| 5,526,941 | A | * | 6/1996 | Ford ............... A47F 5/0869 211/60.1 |
| 5,636,819 | A | | 6/1997 | Kettlestrings |
| 5,641,081 | A | * | 6/1997 | Merl ............... A47F 5/08 211/106 |
| 5,695,078 | A | * | 12/1997 | Otema ............... A47B 96/1416 211/187 |
| 5,769,247 | A | * | 6/1998 | Merl ............... A47B 47/022 211/88.01 |
| 5,857,577 | A | * | 1/1999 | Thomas ............... A47B 96/061 211/94.01 |
| 5,918,843 | A | * | 7/1999 | Stammers ........... F16B 12/2063 248/231.71 |
| 6,023,800 | A | * | 2/2000 | Stickley ............... A61G 7/0507 5/503.1 |
| 6,209,835 | B1 | * | 4/2001 | Walrath ............. F16M 11/28 248/276.1 |
| 6,494,327 | B2 | * | 12/2002 | Huang ............. B62H 3/12 211/205 |
| 6,601,813 | B1 | * | 8/2003 | Kager ............. F16M 13/00 248/314 |
| 6,644,614 | B1 | * | 11/2003 | Chen ............. F16M 11/046 381/361 |
| 6,659,295 | B1 | * | 12/2003 | De Land ............. A47B 96/04 211/187 |
| 6,932,225 | B2 | * | 8/2005 | Rowe ............. A47B 57/30 211/90.02 |
| 6,964,085 | B2 | | 11/2005 | Boda |
| 7,060,040 | B2 | * | 6/2006 | Farmer ............. A47G 1/0638 600/573 |
| 7,275,648 | B2 | | 10/2007 | Segovia, Jr. |
| 7,296,697 | B2 | * | 11/2007 | Costa ............. A47B 96/1458 211/90.03 |
| 7,427,053 | B2 | * | 9/2008 | Nawrocki ............. A47F 5/0006 248/302 |
| 7,527,600 | B2 | * | 5/2009 | Farmer ............. F16B 9/058 403/93 |
| 7,546,993 | B1 | * | 6/2009 | Walker ............. F16M 11/24 248/229.12 |
| 7,731,138 | B2 | * | 6/2010 | Wiesner ............. F16M 11/40 248/231.71 |
| 7,891,618 | B2 | * | 2/2011 | Carnevali ............. A47B 21/0314 248/228.6 |
| 8,087,521 | B2 | * | 1/2012 | Schwartzkopf ......... A47F 5/101 211/94.01 |
| 8,225,679 | B2 | | 7/2012 | Flaherty et al. |
| 8,459,602 | B2 | * | 6/2013 | Herskovic .......... F16M 11/2035 248/229.15 |
| 8,596,601 | B1 | * | 12/2013 | Andersen ............. A47G 1/1633 248/231.71 |
| 8,695,957 | B2 | * | 4/2014 | Quintania ............. A61B 90/57 269/74 |
| 8,998,009 | B2 | * | 4/2015 | Kim ............. A47B 96/067 211/175 |
| 9,107,496 | B2 | * | 8/2015 | Lindo ............. A47K 3/281 |
| 9,121,423 | B2 | * | 9/2015 | Sharpe ............. F16M 13/022 |
| 9,341,308 | B2 | * | 5/2016 | Lacy ............. F16M 13/022 |
| 9,763,515 | B2 | * | 9/2017 | Fratilla ............. A47B 73/00 |
| 10,035,467 | B2 | | 7/2018 | Flaherty |
| 10,144,359 | B2 | | 12/2018 | Zander et al. |
| 10,738,808 | B2 | * | 8/2020 | Pryor ............. A61M 5/1415 |
| 11,432,648 | B1 | * | 9/2022 | Black ............. A47B 96/066 |
| 2004/0226903 | A1 | * | 11/2004 | Wang ............. A47B 57/04 211/187 |
| 2005/0006542 | A1 | * | 1/2005 | Henning ............. F16M 11/2064 248/274.1 |
| 2006/0259018 | A1 | * | 11/2006 | Shilkrut ............. F16M 13/022 606/1 |
| 2008/0099649 | A1 | | 5/2008 | Cavasos |
| 2008/0116340 | A1 | * | 5/2008 | Greene ............. F16M 13/022 248/229.15 |
| 2008/0237426 | A1 | * | 10/2008 | Walters ............. H04N 5/64 248/304 |
| 2010/0207003 | A1 | * | 8/2010 | Bruno ............. F16M 11/40 248/231.21 |
| 2012/0217215 | A1 | * | 8/2012 | Emery ............. A47K 3/281 24/570 |
| 2014/0091193 | A1 | * | 4/2014 | Simon ............. F16M 13/00 248/458 |
| 2015/0090845 | A1 | * | 4/2015 | Trelford ............. F16M 11/10 248/65 |
| 2015/0090849 | A1 | * | 4/2015 | Breitweiser ............. F16M 11/04 248/230.1 |
| 2016/0045048 | A1 | * | 2/2016 | Katz ............. A47G 23/0225 220/737 |
| 2016/0193969 | A1 | | 7/2016 | Johansson |
| 2017/0205024 | A1 | * | 7/2017 | Hennessey ............. F16B 2/12 |
| 2018/0073528 | A1 | * | 3/2018 | Pryor ............. F16B 2/065 |

(56) References Cited

U.S. PATENT DOCUMENTS

2018/0344025 A1* 12/2018 Corbo ............... A47B 21/04
2019/0000246 A1*  1/2019 Holmes ............. A47G 1/142

FOREIGN PATENT DOCUMENTS

WO       2017044078 A1    3/2018
WO       2020205005 A1   10/2020

OTHER PUBLICATIONS

International Searching Authority, Written Opinion, PCT Application No. PCT/CA2020/051468, dated Jan. 19, 2021, CA.

Shed Windows and More, VersaCaddy Product Webpage, available at https://shedwindowsandmore.com/shed-accessories/versacaddy/ (last visited Dec. 1, 2021), US.

Gladiator Canada, Wall Organization Product Webpage, available at https://www.gladiatorgarageworks.ca/collections/wall-organization/Hooks-Baskets-&-Bins (last visited Oct. 29, 2020), CA.

Proslat Canada, Aluminum Slatwall Product Webpage, available at https://proslat.ca/collections/aluminum-slatwalls (last visited Oct. 29, 2020), CA.

Proslat Canada, Custom Residential, Retail & Commercial Slatwalls Products Webpage, available at https://proslat.ca/pages/slatwall (last visited Oct. 29, 2020), CA.

EZStudRack Product Webpage, available at https://ezstudrack.com (last visited Mar. 23, 2020), US.

Rubbermaid, Garage Organization—Garage Shelving, Wall Panels, Rails Products Webpage, available at https://www.rubbermaid.com/garage-organization (last visited Oct. 29, 2020), US.

Gladiator Canada, Gear Track Packs Product Webpage, available at https://www.gladiatorgarageworks.ca/pages/geartracks-packs (last visited Oct. 29, 2020), CA.

Gempler's, Gempler's Heavy-Duty, Two-Tine, Stud-Mount Tool Rack Product Webpage, available at https://gemplers.com/products/gemplers-heavy-duty-two-tine-stud-mount-tool-rack-14-1-2l (last visited Mar. 23, 2020), US.

Jwwinco, Torque Limiting Knurled Knobs Product Information Page, available at https://www.jwwinco.com/ (last visited Oct. 26, 2020), US.

Studshelf, Products Webpage, available at https://studshelf.com/products (last visited Mar. 23, 2020), US.

Proslat Canada, PVC Slatwall Product Webpage, available at https://proslat.ca/collections/pvc-slatwall (last visited Oct. 29, 2020), CA.

Lee Valley Tools, Shelf Bracket Set Product Webpage, available at https://www.leevalley.com/en-ca/shop/hardware/storage-and-organization/brackets/51850-shelf-bracket-set?item=00S3601 (last visited Oct. 29, 2020), CA.

Proslat Canada, Slatwall Accessories Product Webpage, available at https://proslat.ca/collections/slatwall-complementary-accessories (last visited Oct. 29, 2020), CA.

* cited by examiner

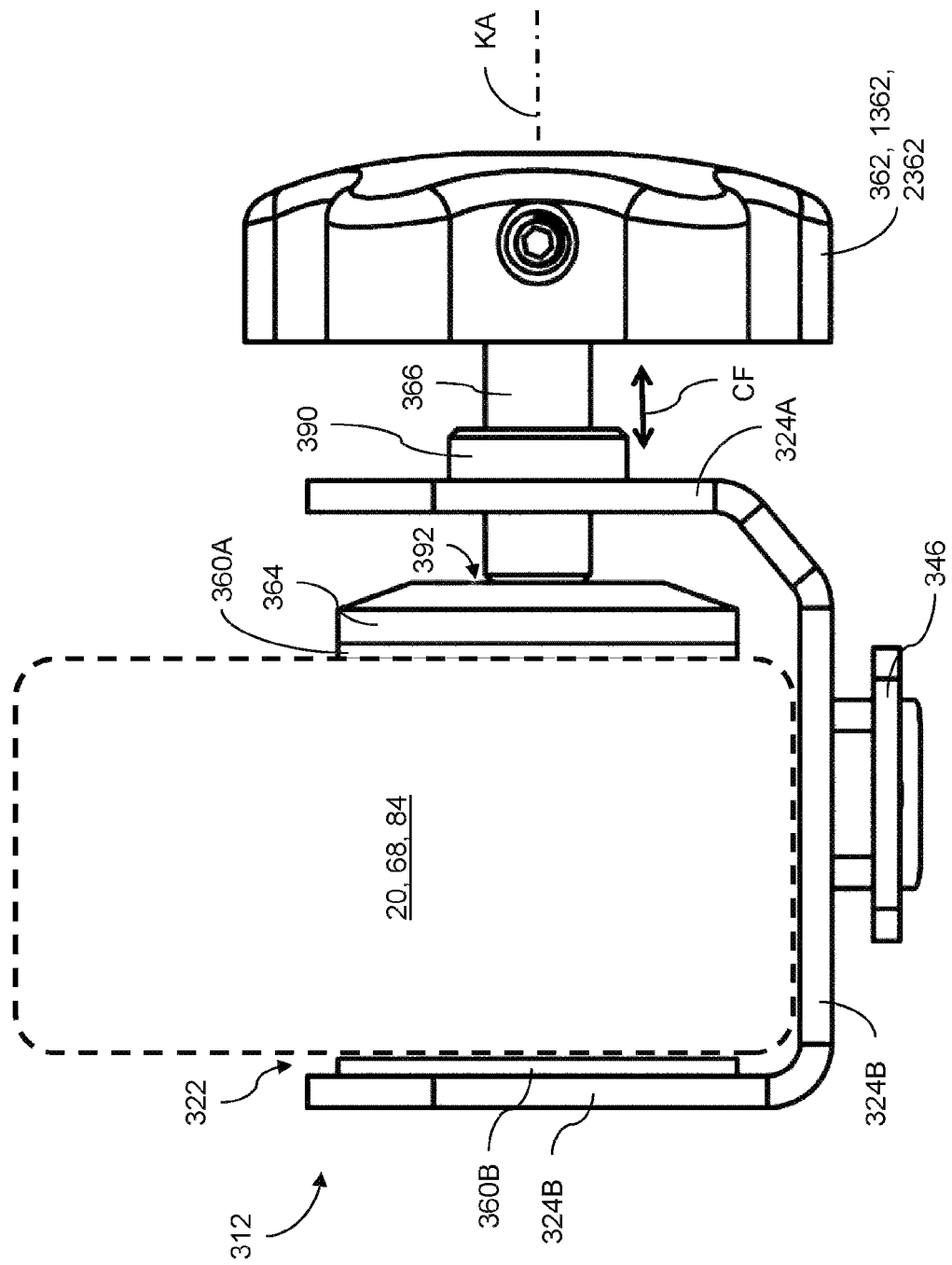

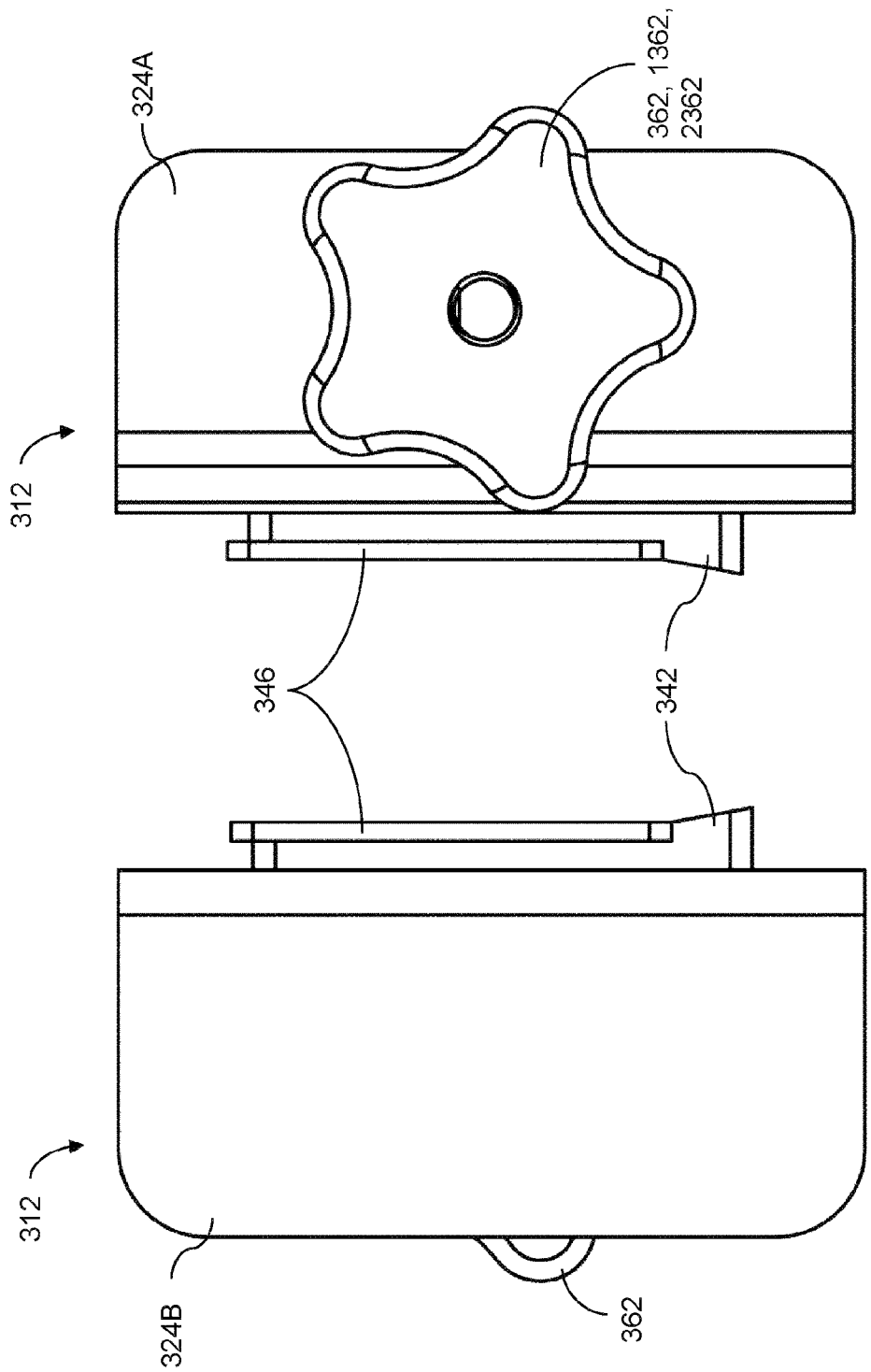

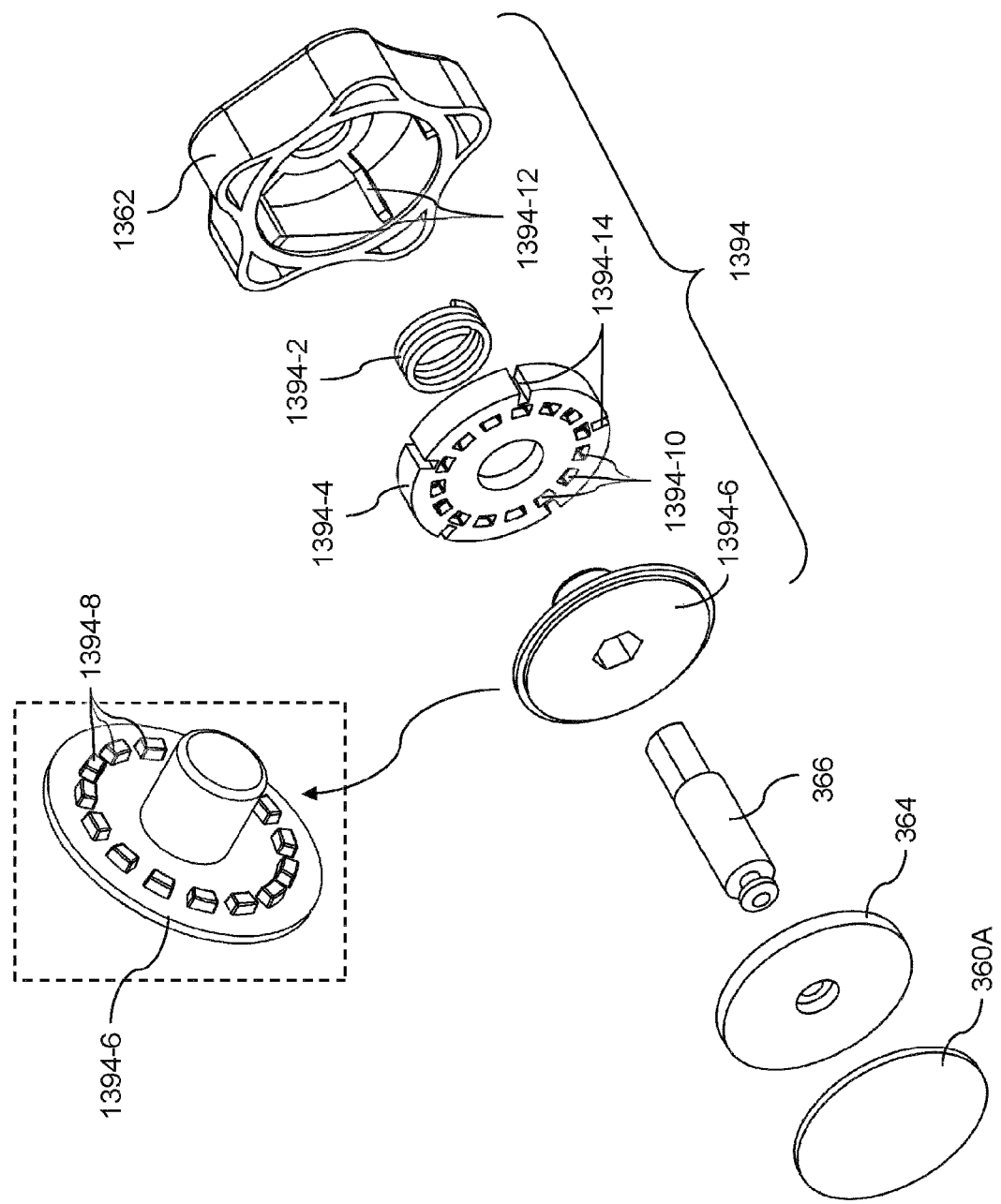

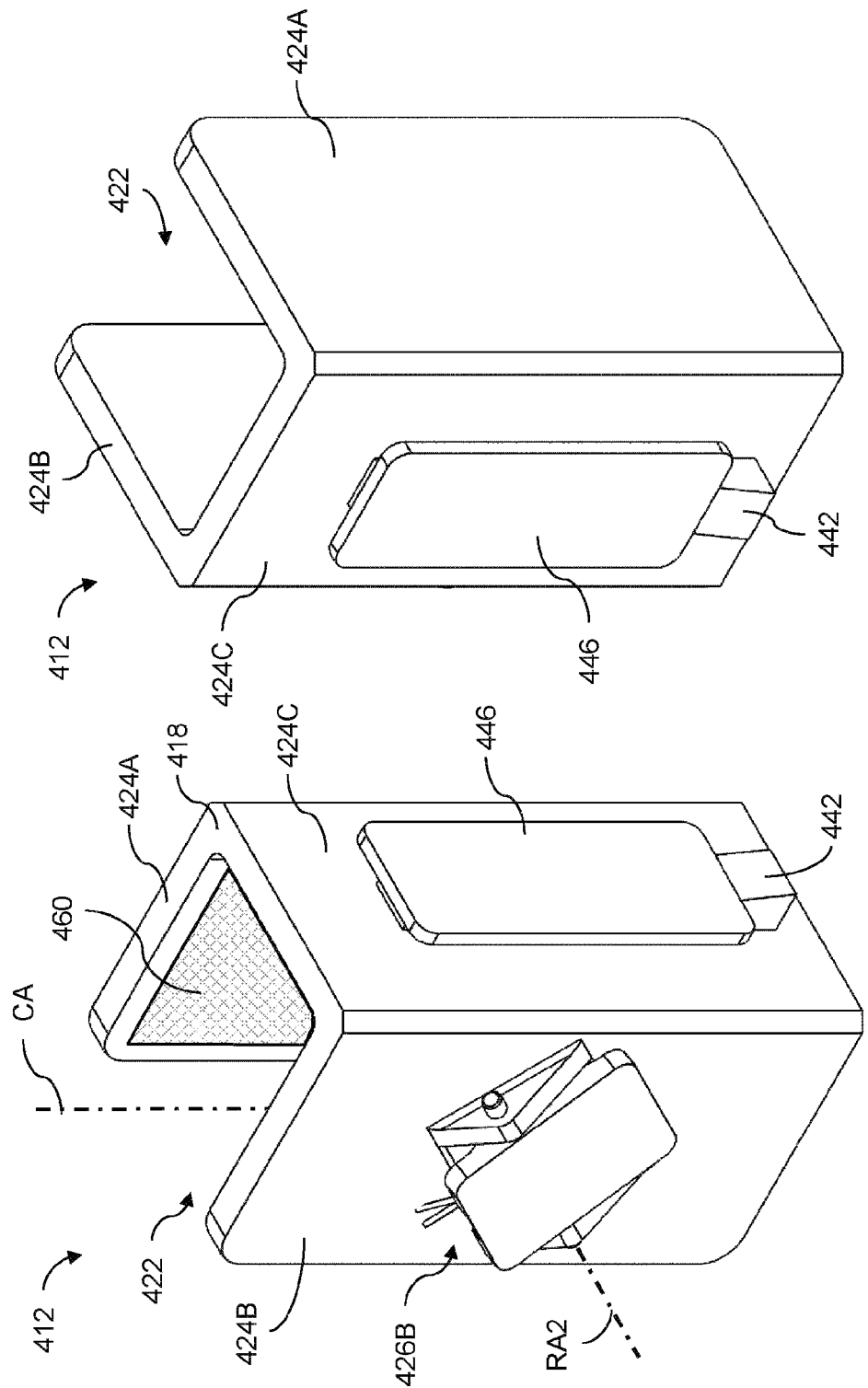

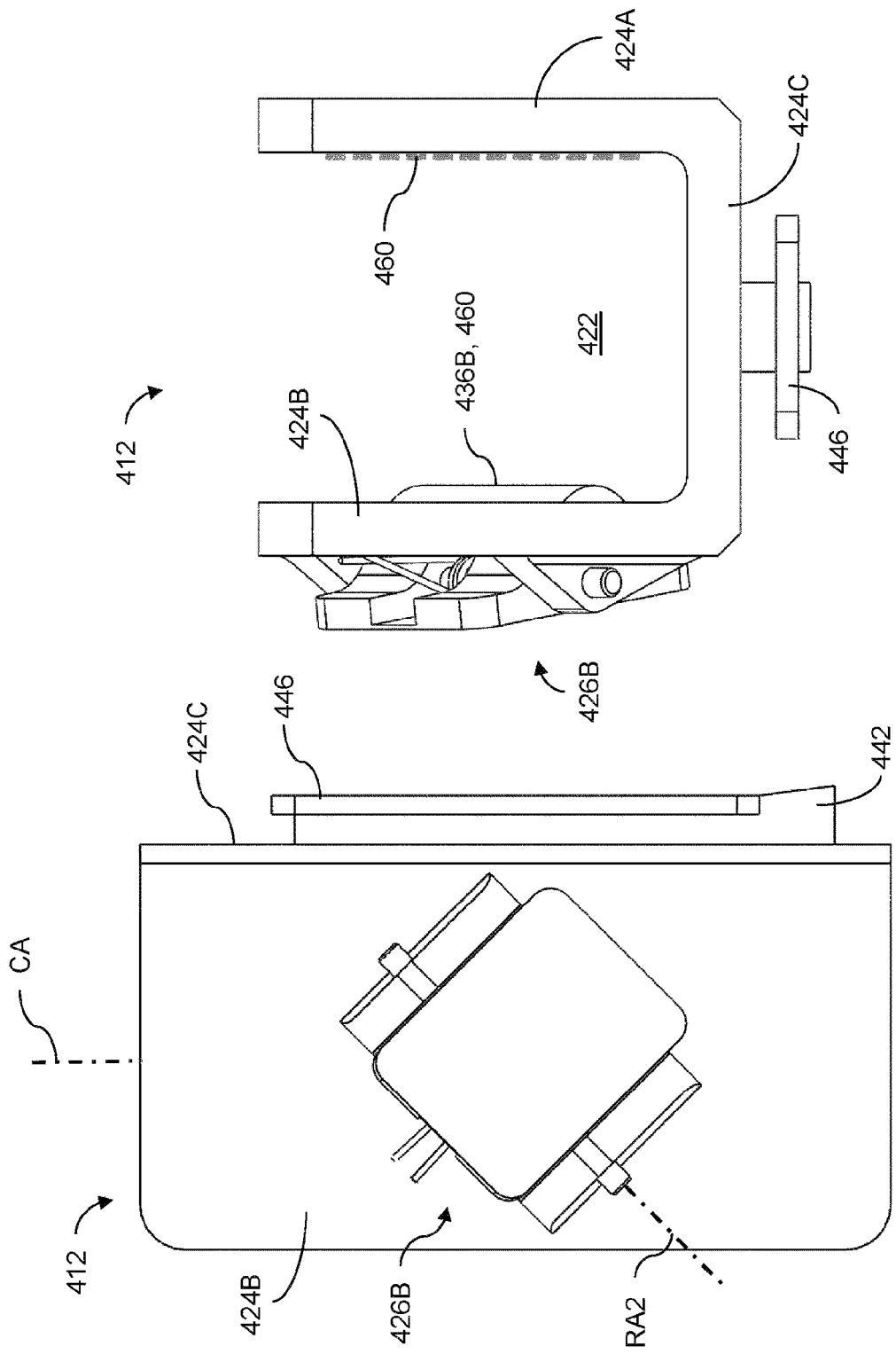

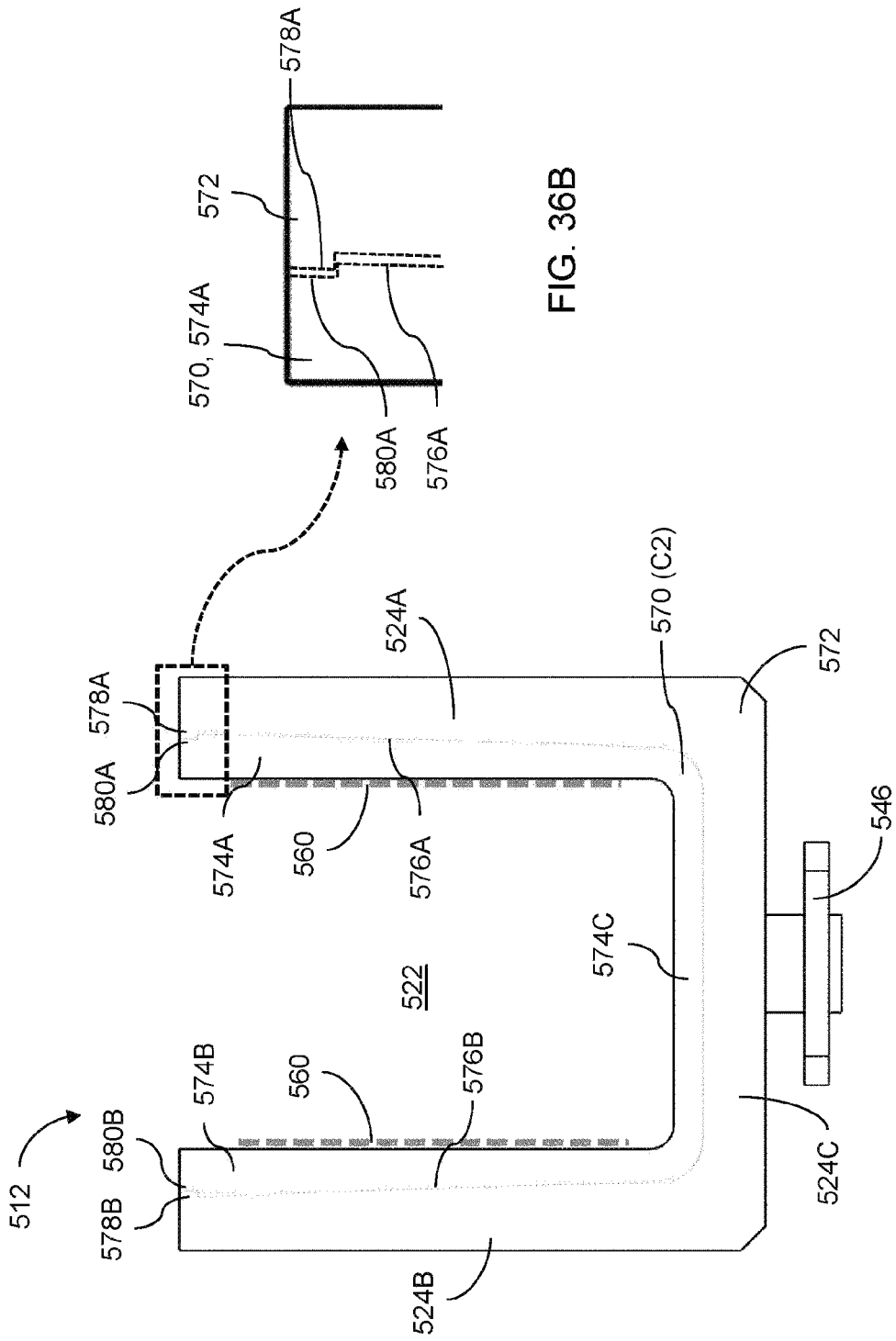

ORGANIZATIONAL SYSTEMS AND COMPONENTS

CROSS REFERENCE TO RELATED APPLICATION AND CLAIM OF PRIORITY

The present application is related to, claims the priority benefit of, and is a 35 U.S.C. 371 national stage application of International Patent Application Serial No. PCT/CA2020/051468 filed Oct. 30, 2020, which claims priority to U.S. provisional patent application No. 63/017,285 filed on Apr. 29, 2020. The entire contents of each of the aforementioned priority applications are hereby expressly incorporated herein by reference in their entireties.

TECHNICAL FIELD

The disclosure relates generally to organizational systems, and more particularly to organizational systems for mounting to walls and ceilings.

BACKGROUND

Spaces inside garages, basements and sheds are often used to store various items such as (e.g., gardening, cleaning, workshop) tools, sporting equipment, bicycles, toys, yard furniture and musical instruments. Depending on the number of items, storage space available and the number of people that use these items, the degree of organization in such spaces can vary and this can result in items being misplaced.

Existing organizational systems such as shelves, racks or hooks can be installed on walls or ceilings using nails and/or screws. The installation of such systems can vary in degree of difficulty and a successful installation of such systems can depend on the skills of the installer. Existing organizational systems also provide limited flexibility for their relocation and/or reconfiguration. Improvement is desirable.

SUMMARY

In one aspect, the disclosure describes an organizational system bracket for attachment to an elongated member. The organizational system bracket comprises:
- a first wall;
- a second wall facing the first wall and spaced apart from the first wall;
- a third wall interconnecting the first and second walls, the first, second and third walls cooperatively defining a channel for receiving the elongated member, the third wall including an interface for releasable attachment of a storage component to the bracket; and
- a clamp foot movably coupled to the first wall, the clamp foot translatable between an engaged position and a released position to respectively engage and release the elongated member received in the channel.

The organizational system bracket may comprise a rotatable knob drivingly coupled to the clamp foot to cause translation of the clamp foot.

The rotatable knob may be in torque-transmitting engagement with a stem connected to the clamp foot via a swivel connection.

The rotatable knob may be in torque-transmitting engagement with a stem connected to the clamp foot via a torque limiter.

The rotatable knob may have a rotation axis that is substantially parallel to a translation direction of the clamp foot.

The clamp foot may include a friction-enhancing foot surface for engagement with the elongated member.

The second wall may include a friction-enhancing wall surface for engagement with the elongated member.

The channel may extend along a channel axis. A length of the first wall along the channel axis may be greater than a distance between the first and second walls.

The organizational system bracket may comprise a rotatable knob drivingly coupled to the clamp foot via a threaded stem. The threaded stem may extend through the first wall and may be threadably engaged with a nut attached to the first wall. The rotatable knob may be in torque-transmitting engagement with the stem via a torque limiter. The clamp foot may be coupled to the threaded stem via a swivel connection. The channel may extend along a channel axis. A length of the first wall along the channel axis may be greater than a distance between the first and second walls.

Embodiments may include combinations of the above features.

In another aspect, the disclosure describes an organizational system for attachment to a wall or ceiling with one or more exposed elongated members. The organizational system comprises:
- a first bracket configured for attachment to a first of the one or more elongated members, the first bracket including:
- a first wall;
- a second wall facing the first wall and spaced apart from the first wall;
- a third wall interconnecting the first and second walls, the first, second and third walls cooperatively defining a channel for receiving the first elongated member; and
- a clamp foot movably coupled to the first wall, the clamp foot translatable between an engaged position and a released position to respectively engage and release the elongated member received in the channel; and
- a rotatable knob drivingly coupled to the clamp foot to cause translation of the clamp foot; and
- a storage component attachable to the first bracket.

The organizational system may comprise a second bracket configured for attachment to the first or a second of the one or more elongated members. The storage component may be simultaneously attachable to both the first and second brackets.

The storage component may be releasably attached to the first bracket via an interface disposed on the third wall of the first bracket.

The organizational system may comprise the first elongated member. The first elongated member may include a track attachable to the wall or ceiling.

The rotatable knob may be in torque-transmitting engagement with a stem connected to the clamp foot via a swivel connection.

The rotatable knob may be in torque-transmitting engagement with the stem via a torque limiter.

The clamp foot may include a textured and/or rubberized foot surface for engagement with the elongated member. The second wall may include a textured and/or rubberized wall surface for engagement with the elongated member.

The storage component may include a shelf, a tray or a one or more hooks.

Embodiments may include combinations of the above features.

In another aspect, the disclosure describes a method of mounting a storage component to a wall or ceiling with one or more exposed elongated members. The method comprises:

attaching a bracket to a first of the one or more elongated members by:
receiving the first elongated member in a channel defined by the bracket; and
translating a clamp foot of the bracket from a released position to an engaged position to engage the first elongated member received in the channel; and
attaching the storage component to the bracket.

Translating the clamp foot may include converting rotational movement of a knob into translational movement of the clamp foot.

The method may comprise limiting torque transfer between the knob and a connection between the knob and the clamp foot.

The method may comprise providing one or more (e.g., audible, haptic and/or visual) indications to a user of the bracket when a torque input to the knob is equal to or exceeds a prescribed torque value.

The bracket may be a first bracket and the method may comprise:

attaching a second bracket to the first elongated member or to a second of the one or more elongated members; and
attaching the storage component to both the first bracket and the second bracket.

The storage component may include one or more of the following: a hook, a shelf and a tray.

Embodiments may include combinations of the above features.

In another aspect, the disclosure describes an organizational system bracket for attachment to an elongated member. The organizational system bracket comprises:

a base defining a channel for receiving the elongated member, the channel extending along a channel axis; and
a cam rotatably coupled to the base, the cam having a rotation axis non-parallel to the channel axis of the channel defined by the base, the cam rotatable between an engaged position and a released position to respectively engage and release the elongated member received in the channel.

The base may be substantially U-shaped when viewed along the channel axis.

The cam may be resiliently biased toward the engaged position.

The bracket may comprise a handle to permit manual rotation of the cam.

The cam may include a friction-enhancing cam surface for engagement with the elongated member.

The base may include: a first wall; a second wall facing the first wall and spaced apart from the first wall to receive the elongated member between the first and second walls; and a third wall interconnecting the first and second walls.

The cam may be rotatably coupled to the first wall.

The cam may be disposed in a window through the first wall.

The cam may be a first cam rotatably coupled to the first wall and the rotation axis is a first rotation axis. The first cam may be rotatable to selectively engage and release a first side of the elongated member. The bracket may include a second cam rotatably coupled to the second wall. The second cam may be rotatable to selectively engage and release a second side of the elongated member opposite the first side of the elongated member.

The second cam may have a second rotation axis non-parallel to the channel axis.

The first wall may include a first fastener hole extending therethrough. The second wall may include a second fastener hole extending therethrough.

The third wall may include a third fastener hole extending therethrough.

The third wall may include a clip interface for releasable attachment of an accessory clip to the base.

The base may include a marker for providing a visual indication in cooperation with a window formed in the accessory clip.

The rotation axis of the cam may be substantially perpendicular to the channel axis.

The rotation axis of the cam may be oblique to the channel axis.

The rotation axis of the cam may be oriented between 27 and 45 degrees from the channel axis.

The rotation axis of the cam may be oriented at about 45 degrees from the channel axis.

Embodiments may include combinations of the above features.

In another aspect, the disclosure describes a mount for attachment to an elongated member. The mount comprises:

a bracket including:
a base defining a channel for receiving the elongated member, the channel extending along a channel axis; and
a cam rotatably coupled to the base, the cam having a rotation axis non-parallel to the channel axis of the channel defined by the base, the cam rotatable between an engaged position and a released position to respectively engage and release the elongated member received in the channel; and
an accessory clip including a mounting interface for attachment of an object, the accessory clip being releasably attachable to the base.

The base may include: a first wall; a second wall facing the first wall and spaced apart from the first wall to receive the elongated member between the first and second walls; and a third wall interconnecting the first and second walls.

The cam may be a first cam rotatably coupled to the first wall and the rotation axis may be a first rotation axis. The first cam may be configured to selectively engage and release a first side of the elongated member. The mount may include a second cam rotatably coupled to the second wall. The second cam may be configured to selectively engage and release a second side of the elongated member opposite the first side of the elongated member.

The third wall may include an anchor and the accessory clip may include a T-shaped slot for receiving the anchor.

The anchor may provide a visual indication in cooperation with a window formed in the accessory clip.

The rotation axis of the cam may be substantially perpendicular to the channel axis.

The rotation axis of the cam may be oblique to the channel axis.

The rotation axis of the cam may be oriented between 27 and 45 degrees from the channel axis.

The rotation axis of the cam may be oriented at about 45 degrees from the channel axis.

Embodiments may include combinations of the above features.

In another aspect, the disclosure describes an organizational system for attachment to a wall or ceiling with one or more exposed elongated members. The organizational system comprises:

a first bracket configured for attachment to a first elongated member, the first bracket including:
    a base defining a channel for receiving the first elongated member, the channel extending along a channel axis; and
    a cam rotatably coupled to the base, the cam having a rotation axis non-parallel to the channel axis of the channel defined by the base, the cam rotatable between an engaged position and a released position to respectively engage and release the first elongated member received in the channel;
    a second bracket configured for attachment to the first or a second elongated member; and
    a storage component configured for attachment to the first and second brackets.

The system may comprise an accessory clip releasably attachable to the first bracket, the accessory clip including a mounting interface for the storage component.

The storage component may be configured to extend between the first and the second elongated members.

The storage component may include a shelf.

The storage component may include a tray.

The rotation axis of the cam may be substantially perpendicular to the channel axis.

The rotation axis of the cam may be oblique to the channel axis.

The rotation axis of the cam may be oriented between 27 and 45 degrees from the channel axis.

The rotation axis of the cam may be oriented at about 45 degrees from the channel axis.

Embodiments may include combinations of the above features.

In another aspect, the disclosure describes a method of mounting a storage component to a wall or ceiling with one or more exposed elongated members. The method comprises:

attaching a bracket to an elongated member by receiving the elongated member in a channel defined by the bracket and engaging a rotatable cam of the bracket with the elongated member to apply a clamping force on the elongated member, the rotatable cam having a rotation axis non-parallel to a longitudinal axis of the elongated member; and
    attaching the storage component to the bracket.

The method may comprise increasing a magnitude of the clamping force applied on the elongated member by the rotatable cam by increasing a load on the bracket.

The method may comprise reducing the magnitude of the clamping force applied on the elongated member by the rotatable cam by reducing the load on the bracket.

The method may comprise resiliently biasing the rotatable cam toward an engaged position in which the clamping force is applied to the elongated member by the rotatable cam.

The rotation axis of the rotatable cam may be substantially perpendicular to the longitudinal axis of the elongated member.

The rotation axis of the rotatable cam may be oblique to the longitudinal axis of the elongated member.

The rotatable cam may be a first rotatable cam configured to releasably engage a first side of the elongated member. The bracket may include a second rotatable cam configured to releasably engage a second side of the elongated member opposite the first side of the elongated member. The method may include engaging the elongated member with the first and second rotatable cams to apply the clamping force on the elongated member.

The method may comprise securing the bracket to the elongated member using a threaded fastener.

The method may comprise attaching the storage component to the bracket via an accessory clip attached to the bracket.

The method may comprise providing a visual indication indicating attachment of the accessory clip to the bracket.

The storage component may include one or more of the following: a hook, a shelf and a tray.

The elongated member may be a wall stud.

The elongated member may be a ceiling joist.

The bracket may be a first bracket and the elongated member may be a first elongated member. The method may include: attaching a second bracket to a second elongated member; and attaching the storage component to the first and second brackets.

The first bracket may be substantially identical to the second bracket.

Embodiments may include combinations of the above features.

In another aspect, the disclosure describes a method of mounting a storage component to a wall with one or more exposed wall studs. The method comprises:

attaching a bracket to a wall stud by receiving the wall stud in a channel defined by the bracket and engaging a rotatable cam of the bracket with the wall stud to apply a clamping force on the wall stud; and
    attaching the storage component to the bracket.

Embodiments may include combinations of the above features.

In another aspect, the disclosure describes an organizational system bracket for attachment to an elongated member. The bracket comprises:

a first wall;
    a second wall facing the first wall and spaced apart from the first wall; and
    a third wall interconnecting the first and second walls, the first, second and third walls cooperatively defining a channel for receiving the elongated member, the third wall including a clip interface for releasable attachment of an accessory clip to the bracket;
    wherein the first wall includes a first fastener hole for receiving therethrough a first fastener for engaging the elongated member.

The second wall may include a second fastener hole for receiving therethrough a second fastener for engaging the elongated member.

The third wall may include a third fastener hole for receiving therethrough a third fastener for engaging the elongated member.

The clip interface may include an anchor configured to engage a T-shaped slot formed in the accessory clip.

The anchor may provide a visual indication in cooperation with a window formed in the accessory clip.

Embodiments may include combinations of the above features.

In another aspect, the disclosure describes an organizational system bracket for attachment to an elongated member. The bracket comprises:

an insert defining an insert receptacle for receiving the elongated member, the insert being configurable between a released configuration and an engaged configuration to respectively release and engage the elongated member received in the receptacle; and a sleeve defining a sleeve receptacle for receiving the insert, the sleeve receptacle being sized to define an interference fit between the sleeve receptacle and the insert to urge the insert toward the engaged configuration when the insert is inserted into the sleeve receptacle.

The insert may be biased toward the released configuration.

The insert may be configurable between the released configuration and the engaged configuration by flexing of the insert.

The insert receptacle is substantially U-shaped.

The insert may include: a first wall having a first inner surface partially defining the insert receptacle; a second wall facing the first wall and spaced apart from the first wall, the second wall having a second inner surface partially defining the insert receptacle; and a third wall interconnecting the first and second walls.

The first wall may have a first outer surface opposite the first inner surface. The second wall may have a second outer surface opposite the second inner surface. The first and second outer surfaces may cooperatively define a cuneiform interface for engagement with the sleeve.

The insert may define a cuneiform interface for engagement with the sleeve.

The insert and the sleeve may include cooperating interlocking features.

The insert may include a friction-enhancing surface for engagement with the elongated member.

Embodiments may include combinations of the above features.

In another aspect, the disclosure describes a method of mounting a storage component to a wall or ceiling with one or more exposed elongated members. The method comprises:
attaching a bracket to an elongated member by:
receiving the elongated member in an insert receptacle defined by an insert configurable between a released configuration and an engaged configuration where the insert engages the elongated member; and
urging the insert toward the engaged configuration using a sleeve receiving the insert; and
attaching the storage component to the bracket.

Urging the insert toward the engaged configuration may include flexing the insert.

Urging the insert toward the engaged configuration may include progressively engaging the sleeve with a cuneiform interface defined on the insert.

The method may comprise interlocking the insert and the sleeve when the sleeve is in the engaged configuration.

Embodiments may include combinations of the above features.

In a further aspect, the disclosure describes an organizational system including one or more brackets as described herein.

Further details of these and other aspects of the subject matter of this application will be apparent from the detailed description included below and the drawings.

DESCRIPTION OF THE DRAWINGS

Reference is now made to the accompanying drawings, in which:

FIG. 20 is a top plan view of the bracket of FIG. 19;

FIG. 21 is a left side elevation view of the bracket of FIG. 19;

FIG. 22 is a right side elevation view of the bracket of FIG. 19;

FIG. 24B is a perspective exploded view of the assembly of FIG. 24A;

FIG. 27 is a perspective view of another exemplary bracket of the mount;

FIG. 28 is another perspective view of the bracket of FIG. 27;

FIG. 29 is left side elevation view of the bracket of FIG. 27;

FIG. 30 is top plan view of the bracket of FIG. 27;

FIG. 36A is a top plan view of the bracket of FIG. 33;

FIG. 36B is an enlarged top view of a portion of the bracket of FIG. 33;

DETAILED DESCRIPTION

The following disclosure describes organizational systems, associated components and methods for garages, sheds, basements or other spaces that have walls or ceilings with exposed and accessible elongated members such as wall studs or ceiling joists. In some embodiments, the systems include one or more mounts (i.e., hangers) that attach to one or more elongated members and that provide a suitable mounting interface for one or more objects to be stored or one or more storage components (e.g., hook, rail, rack, rod, bin, pouch, shelf, tray). In various embodiments, the mount may be capable of being frictionally engaged with an elongated member. In some embodiments, the mount may include a base defining a channel for receiving the elongated member therein and one or more mechanisms to engage and release the elongated member received in the channel.

Various embodiments of mounts and storage components are described herein. In some embodiments, the mounts described herein may be releasably attached to elongated members relatively easily and without the use of tools. In some embodiments, the organizational systems and components described herein may also provide flexibility in relocation and reconfiguration without damaging the elongated member(s).

The terms "attached" and "coupled" may include both direct attachment or coupling (in which two elements are in direct contact each other) and indirect attachment or coupling (in which at least one additional (i.e., intermediate) element is disposed between the two elements).

The term "substantially" as used herein may be applied to modify any quantitative representation which could permissibly vary without resulting in a change in the basic function to which it is related.

The term "elongated member" as used herein is intended to encompass a wall stud, joist, rafter, post, beam, column, track, rail or a linear profile. The elongated member may be a structural component part of the framing of a wall or ceiling, or maybe attached to and supported by the wall or ceiling. The elongated member may be oriented vertically, horizontally or at some other orientation. The elongated member may be generally linear (straight) or non-linear (e.g., curved beam or curved track). The elongated member may have a four-sided (e.g., rectangular or square) cross-sectional profile, or have a cross-sectional profile of another shape. The elongated member may be made from wood, metal, plastic or other suitable material(s).

Aspects of various embodiments are described through reference to the drawings.

Figure 1:
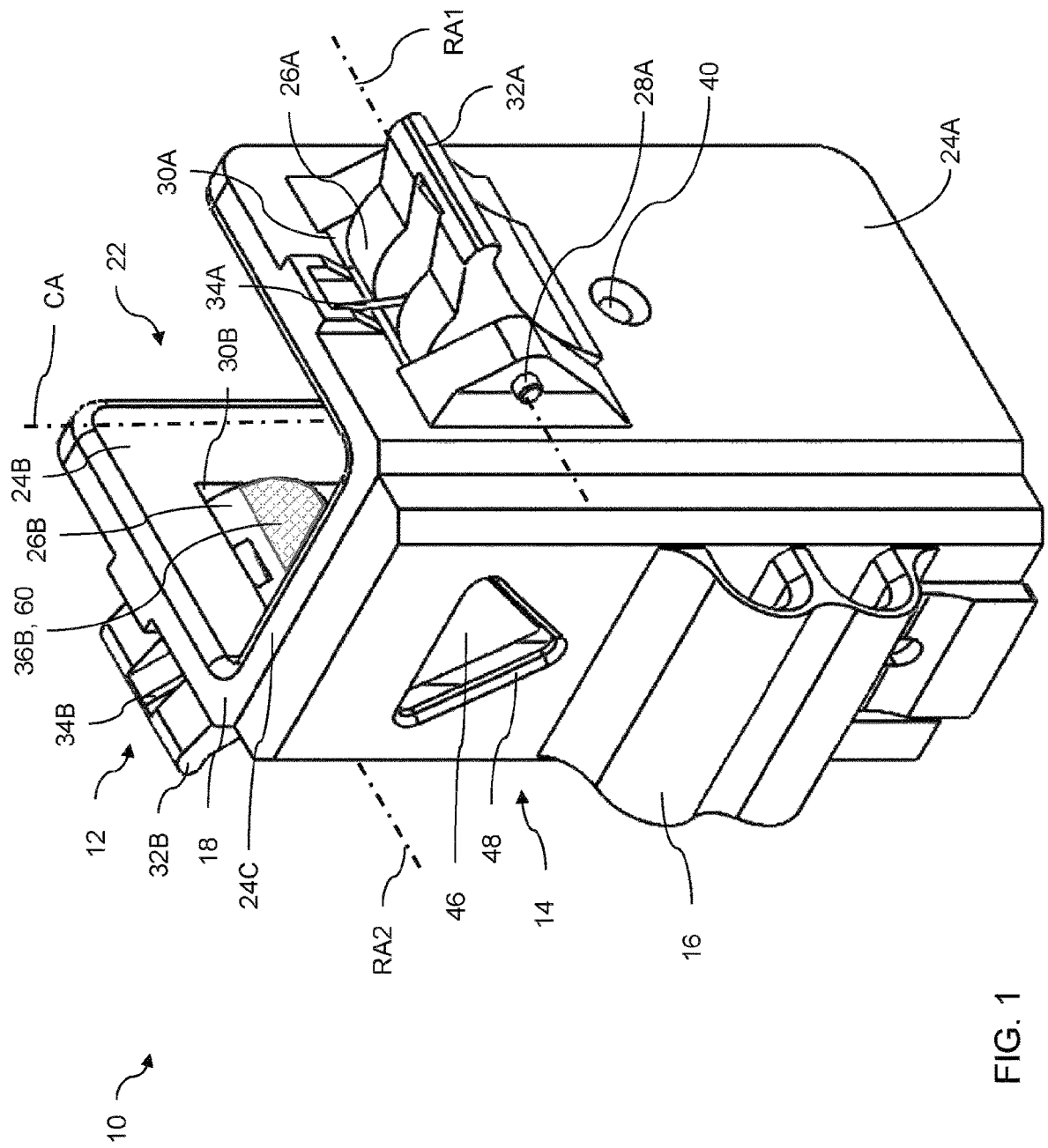
FIG. 1 is a perspective view of an exemplary mount for an organizational system as described herein.
Figure 2:
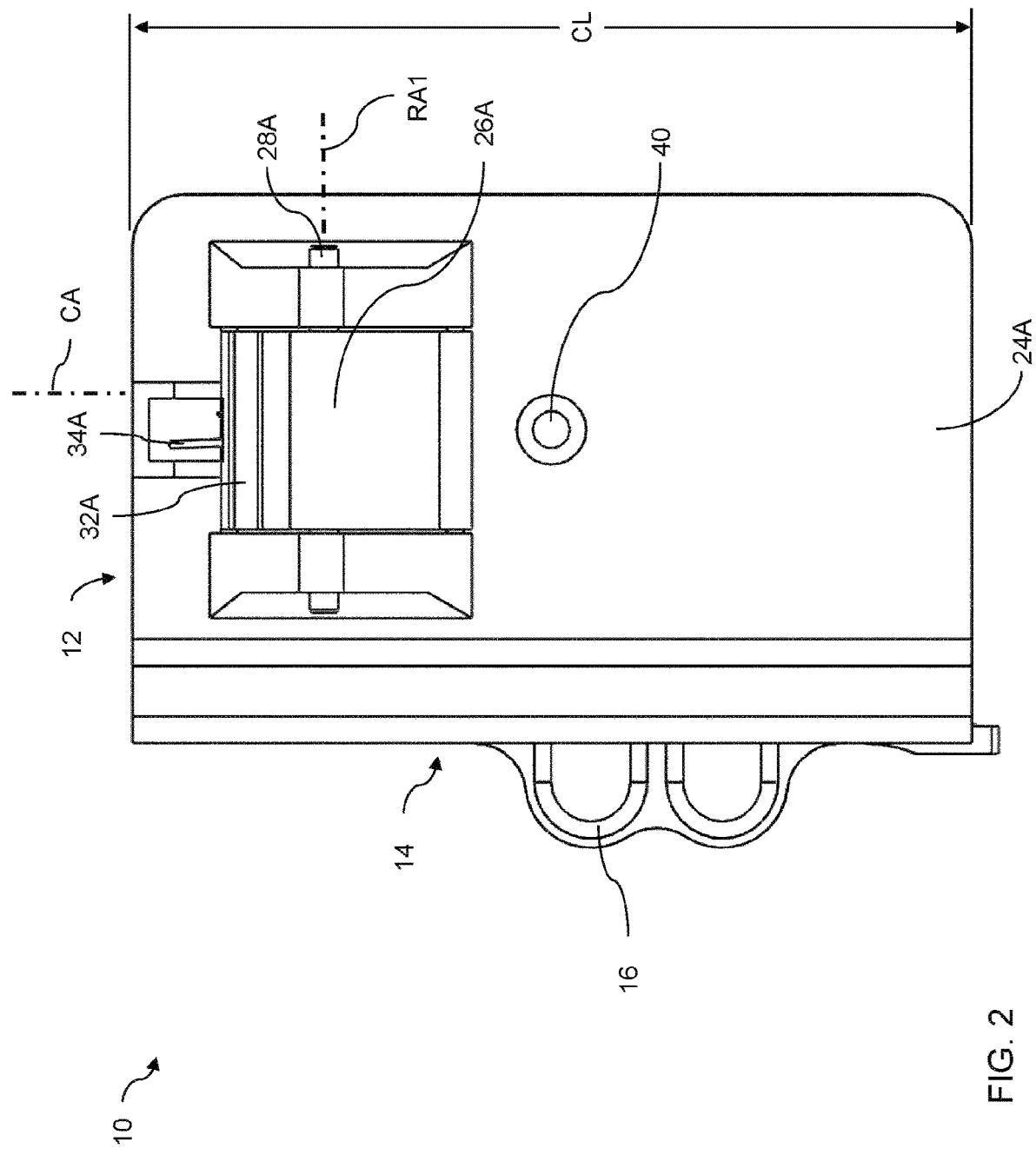
FIG. 2 is a right side elevation view of the mount of FIG. 1.

FIGS. 1 and 2 are respective perspective and right side elevation views of an exemplary mount 10 for an organizational system as described herein. Mount 10 may be configured to be releasably attached to a (e.g., unfinished) wall having one or more exposed and substantially vertical elongated members such as wall studs without the use of tools. In the embodiment illustrated, mount 10 includes bracket 12 and accessory clip 14 that is releasably attachable to bracket 12 also without the use of tools. Accessory clip 14 may include mounting interface 16 for attachment of one or more objects to be stored, or, for attachment of a storage component that facilitates the storage of one or more objects. The removability of accessory clip 14 from bracket 12 may provide flexibility in the configurations of organizational systems that may be implemented using one or more brackets 12 and optionally one or more accessory clips 14 and/or storage components. For example, accessory clips 14 providing different types of mounting interfaces 16 may be selected and used with brackets 12 of a common type. In other words, bracket 12 of a common (e.g., universal) type may be used with different types of accessory clips 14 providing different types of mounting interfaces 16 to implement different storage solutions.

It is understood that the ability to substitute mounting interface 16 from bracket 12 via interchangeable accessory clips 14 is optional. In some embodiments of mount 10, mounting interface 16 could instead be permanently attached (e.g., integrally formed, fastened, glued) to bracket 12. For example, mounting interface 16 could be integrally formed with base 18 of bracket 12 so that mounting interface 16 and base 18 have a unitary construction. Mounting interface 16 may include one or more hooks, holes, rails, channels, recesses and/or protrusions that may itself/themselves serve as a storage component for mounting an object to be stored, or allow for a suitable storage component to be releasably attached thereto without the use of tools.

Figure 3:
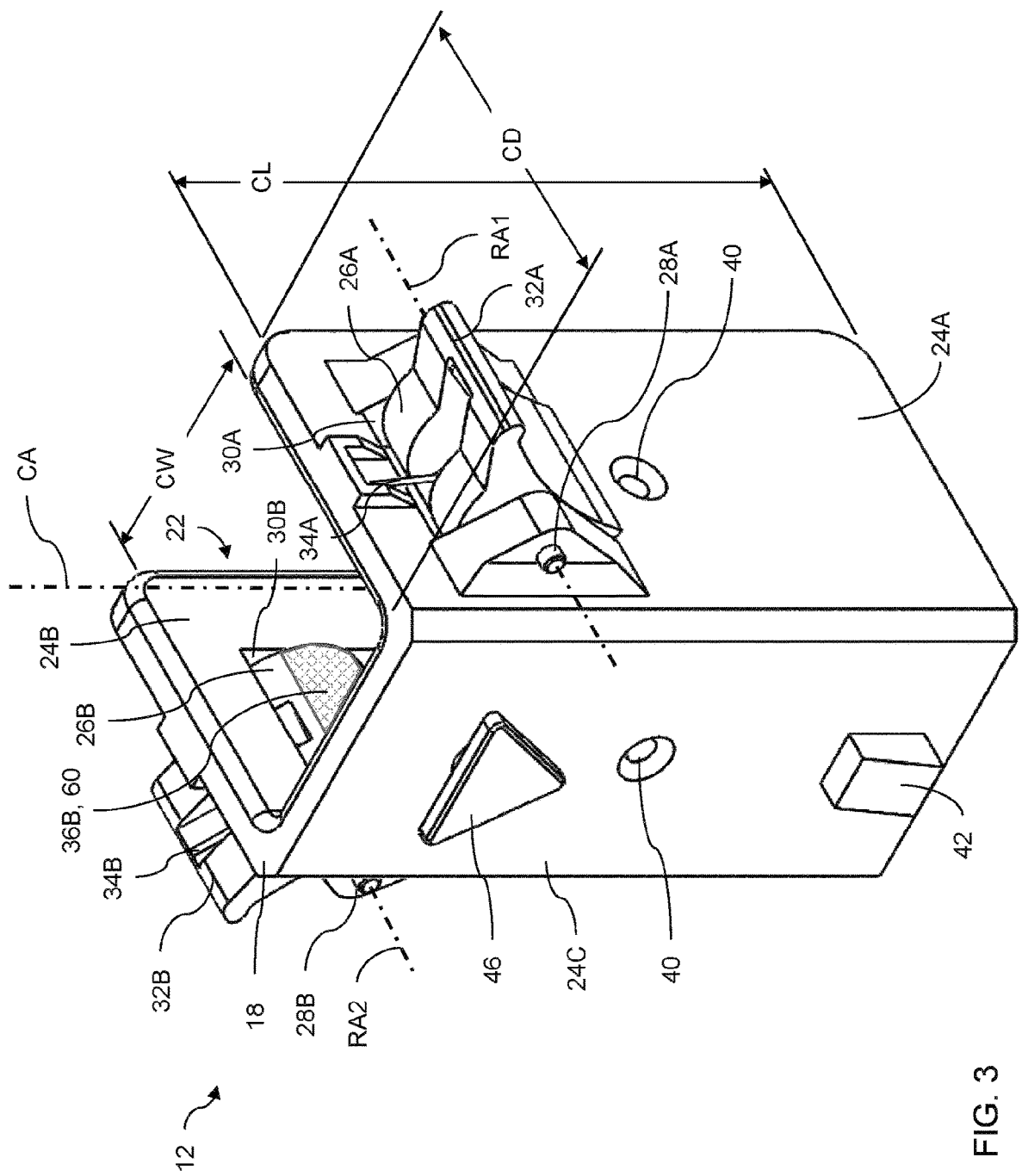
FIG. 3 is a perspective view of an exemplary bracket of the mount.
Figure 4:
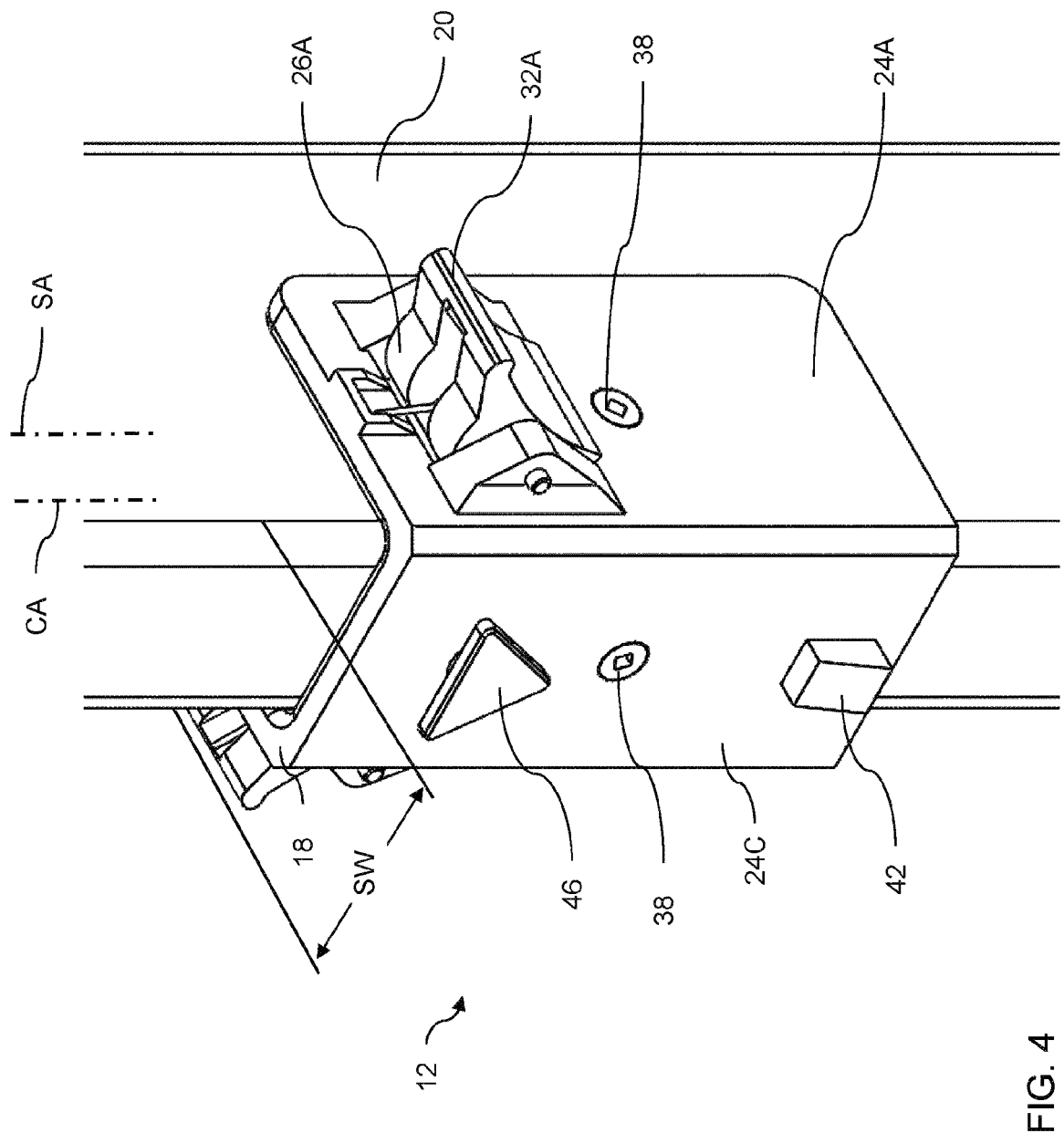
FIG. 4 is a perspective view of the bracket of FIG. 3 attached to a wall stud.

FIGS. 3 and 4 are perspective views of an exemplary bracket 12 of mount 10. FIG. 3 shows bracket 12 in isolation. FIG. 4 shows bracket 12 being releasably attached to wall stud 20 or other type of elongated member. Wall stud 20 may be a substantially vertical framing member in a building's wall and may be a fundamental framing element in buildings (e.g., houses, garages, sheds). Traditionally, wall studs were framing elements made of wood and had transverse cross-sectional dimensions of 2" (about 5 cm)×4" (about 10 cm) or 2" (about 5 cm)×6" (about 15 cm). These historically traditional dimensions have been reduced but such framing elements still carry the name of "two by four" and "two by six" respectively. Typical dimensions of today's "two by four" is 1.5" (about 3.8 cm)×3.5" (about 8.9 cm). Typical dimensions of today's "two by six" is 1.5" (about 3.8 cm)×5.5" (about 12.7 cm). Wall stud 20 may be made of wood, metal or other material(s). Wall stud 20 may have a longitudinal stud axis SA that is substantially vertical when in use as a framing element in a wall. In a wall construction, a plurality of wall studs 20 may be spaced apart, substantially parallel and placed 12 inches (about 30 cm), 16 inches (about 40.6 cm) or 24 inches (about 61 cm) from each other's center. It is understood bracket 12 can be constructed to accommodate wall studs 20 of various dimensions.

In reference to FIG. 3, base 18 of bracket 12 may define channel 22 for receiving wall stud 20 therein. Channel 22 may extend along channel axis CA. In some embodiments, base 18 of bracket 12 may be substantially U-shaped (or C-shaped) when viewed along channel axis CA. Base 18 may include first wall 24A, second wall 24B and third wall 24C defining channel 22. First wall 24A and second wall 24B may be substantially parallel to each other. First wall 24A and second wall 24B may face each other and be spaced apart from each other to receive wall stud 20 between first wall 24A and second wall 24B. Third wall 24C may interconnect first wall 24A and second wall 24B. In some embodiments, third wall 24C may be substantially perpendicular to first wall 24A and second wall 24B.

Channel 22 may have channel width CW, channel depth CD and channel length CL. Base 18 may be dimensioned to provide a desired stability of bracket 12 when wall stud 20 is received in channel 22. In some embodiments, channel length CL may be greater than channel width CW. In some embodiments, channel length CL may be at least two times greater than channel width CW. In some embodiments, channel length CL may be greater than channel depth CD. In some embodiments, channel depth CD may be greater than channel width CW. Channel width CW may be slightly larger than stud width SW (shown in FIG. 4) so that a clearance fit may be provided between channel 22 and wall stud 20, and bracket 12 may be easily placed on and removed from wall stud 20. When a front part of wall stud 20 is received in channel 22 and abuts against a channel-facing side of third wall 24C, channel axis CA may be substantially parallel to stud axis SA. First wall 24A, second wall 24B and third wall 24C are shown as all having the same length substantially corresponding to channel length CL. However, it is understood that first wall 24A, second wall 24B and third wall 24C may not necessarily all have the same length.

Bracket 12 may have one or more rotatable cams 26A, 26B. First cam 26A and second cam 26B may each be rotatable between an engaged position and a released position to respectively engage and release laterally opposite (e.g., and parallel) sides of wall stud 20 received in channel 22. First cam 26A and second cam 26B may be laterally-opposed and used to secure bracket 12 to wall stud 20. First cam 26A may be rotatably coupled to first wall 24A via first pivot pin 28A. Second cam 26B may be rotatably coupled to second wall 24B via second pivot pin 28B. First cam 26A may have rotation axis RA1 that is substantially transverse to channel axis CA. Second cam 26B may have rotation axis RA2 that is substantially transverse to channel axis CA. Rotation axes RA1 and RA2 may be substantially parallel. Rotation axes RA1 and RA2 may each be non-parallel to channel axis CA. Rotation axes RA1 and RA2 may each be substantially perpendicular to channel axis CA.

First and second cams 26A, 26B may be respectively disposed in first and second windows 30A, 30B extending respectively through first and second walls 24A, 24B. First and second cams 26A, 26B may include respective handles 32A, 32B to permit manual rotation of first and second cams 26A, 26B about their respective rotation axes RA1 or RA2.

In some embodiments, first and second cams 26A, 26B may be resiliently biased toward their respective engaged positions via respective suitable torsion springs 34A, 34B. One leg of each torsion spring 34A, 34B may be engaged with a respective handle 32A or 32B of the respective first cam 26A or second cam 26B. Another leg of each torsion spring 34A, 34B may be engaged with a respective first wall 24A or second wall 24B of base 18 as illustrated.

In some embodiments, first and second cams 26A, 26B may include respective cam surfaces 36A (shown in FIG. 6) and 36B for frictional engagement with wall stud 20. In various embodiments, cam surfaces 36A, 36B may be smooth or textured to provide a relatively high friction coefficient between cam surfaces 36A, 36B and wall stud 20. In some embodiments, cam surfaces 36A, 36B may comprise a material that is resilient and relatively softer than a material of the remainder of first and second cams 26A, 26B. In some embodiments, cam surfaces 36A, 36B may include a friction-enhancing surface 60 which may be textured and/or include a layer of elastomeric material (e.g., rubber) that is integral or attached (e.g., adhered, fastened, overmolded) to respective cams 26A, 26B. For example, friction-enhancing surface 60 may be a rubberized surface (i.e., coated or treated with rubber). For example, friction-enhancing surface 60 may be made from a material that is softer (i.e., more easily yields to touch or pressure) than that a metallic or polymeric material from which base 18 and/or cams 26A, 26B may be made of. In some embodiments, a textured friction-enhancing surface 60 may be knurled (e.g., include a straight line pattern or a diamond pattern), may include ridges and/or grooves, or may otherwise have a relatively rough surface finish to enhance gripping of the elongated member.

In some applications, the engagement of one or more cams 26A, 26B with wall stud 20 may provide sufficient holding capacity. For heavier applications where an increased holding capacity is required, one or more screws 38 (shown in FIG. 4) may optionally be used to positively secure bracket 12 to wall stud 20. Accordingly, bracket 12 may include one or more optional fastener holes 40 (shown in FIG. 3) configured to receive a suitable fastener (e.g., screw) for securing bracket 12 to wall stud 20. In some embodiments, first wall 24A may include one or more fastener holes 40 extending therethrough. In some embodiments, second wall 24B may include one or more fastener holes 40 extending therethrough. In some embodiments, third wall 24C may include one or more fastener holes 40 extending therethrough.

In some embodiments, bracket 12 may include a suitable clip interface for the releasable attachment of accessory clip 14 to bracket 12. Such clip interface may be provided on third wall 24C. The clip interface may, for example, include anchor 46 protruding from (e.g., fastened to, welded to or integrally formed with) third wall 24C. Anchor 46 may be configured to be (e.g., slidingly) received and releasably retained in a cooperating (e.g., T-shaped slot) slot 44 (shown in FIGS. 9 and 10) formed on a rear side of accessory clip 14. Alternatively, it is understood that anchor 46 could instead be part of accessory clip 14 and slot 44 could instead be part of bracket 12. It is understood that other types of clip interfaces may be suitable.

In some embodiments, bracket 12 may include boss 42 protruding from third wall 24C. Boss 42 may interact with accessory clip 14 and provide a hard stop limiting downward movement of accessory clip 14 relative to bracket 12. Boss 42 may be tapered.

In some embodiments, anchor 46 may also serve as a marker to provide a visual indication in cooperation with accessory clip 14 to visually indicate to a user the proper attachment of accessory clip 14 to bracket 12. In some embodiments, anchor 46 may cooperate with window 48 (shown in FIG. 1) formed through accessory clip 14 so that anchor 46 may be visible to a user when anchor 46 and window 48 are in alignment. Anchor 46 may be provided on third wall 24C. In some embodiments, anchor 46 and window 48 may have cooperating (e.g., similar or same) shapes. In some embodiments, anchor 46 may depict a logo of a manufacturer or vendor of bracket 12.

Figure 5:
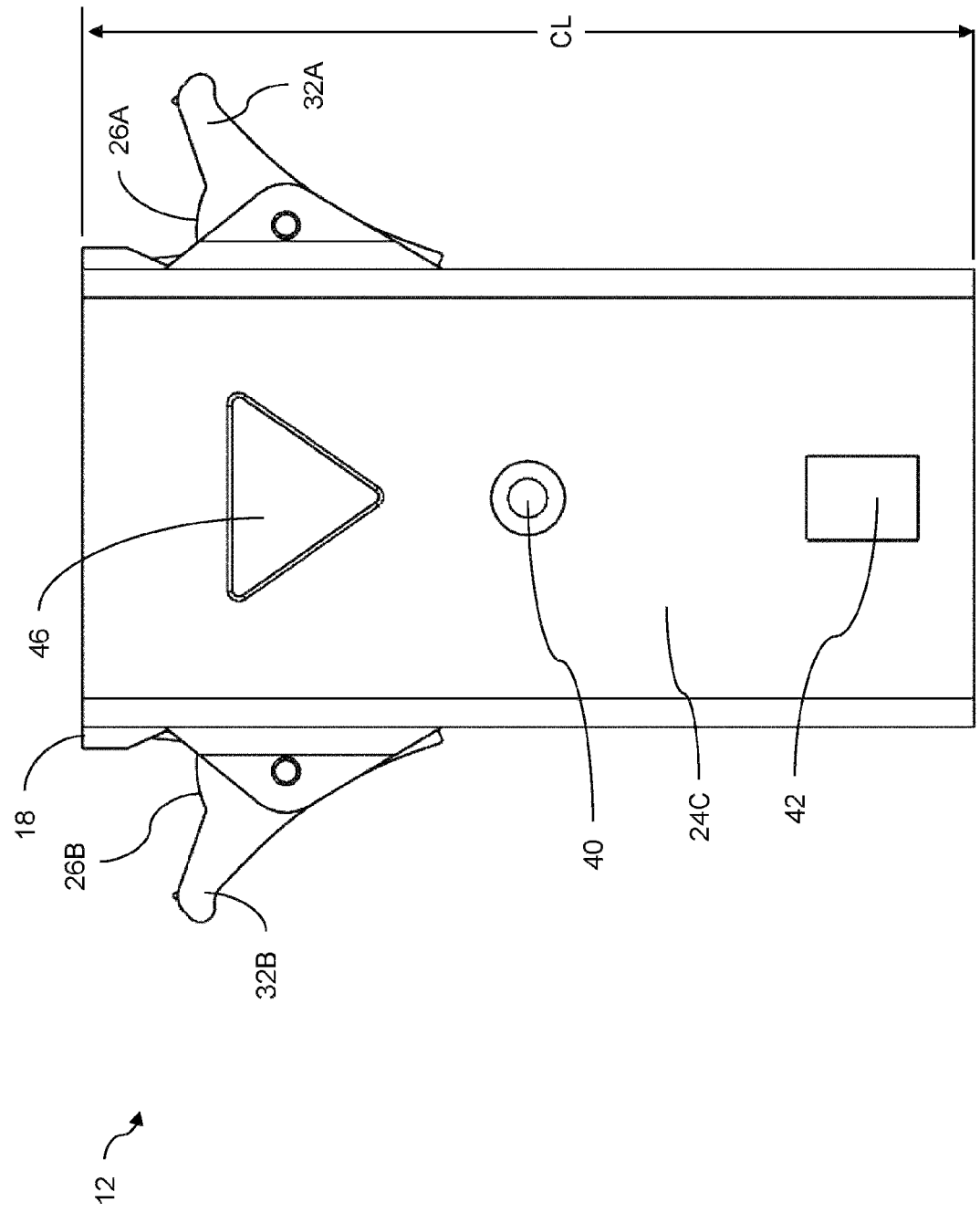
FIG. 5 is a front elevation view of the bracket of FIG. 3.

FIG. 5 is a front elevation view of bracket 12.

Figure 6:
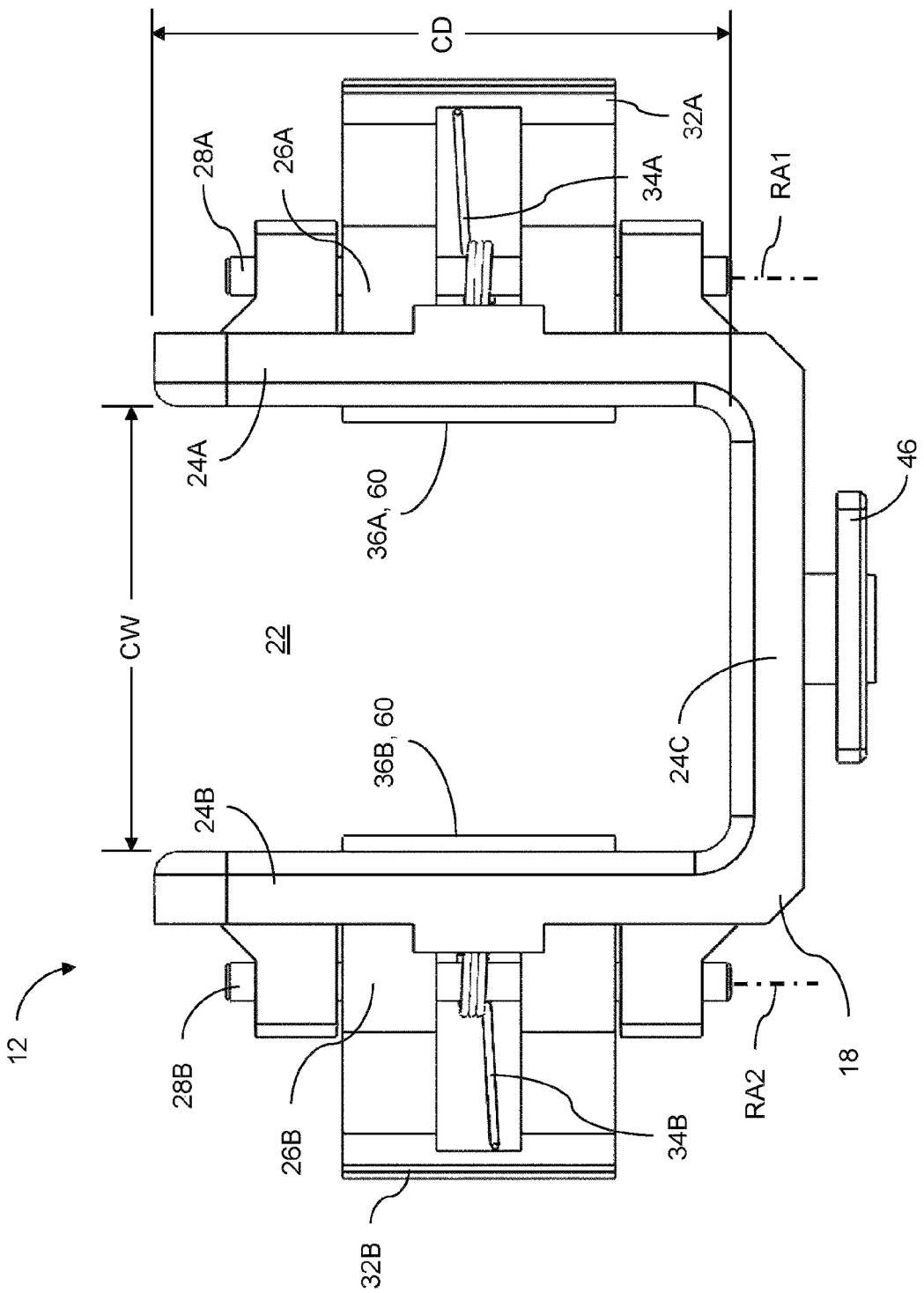
FIG. 6 is a top plan view of the bracket of FIG. 3.

FIG. 6 is a top plan view of bracket 12 where the substantially U-shaped profile defined by first wall 24A, second wall 24B and third wall 24C of base 18 is shown.

FIG. 6 also illustrates torsion springs 34A, 34B engaged with first cam 26A and second cam 26B respectively.

Figure 7:
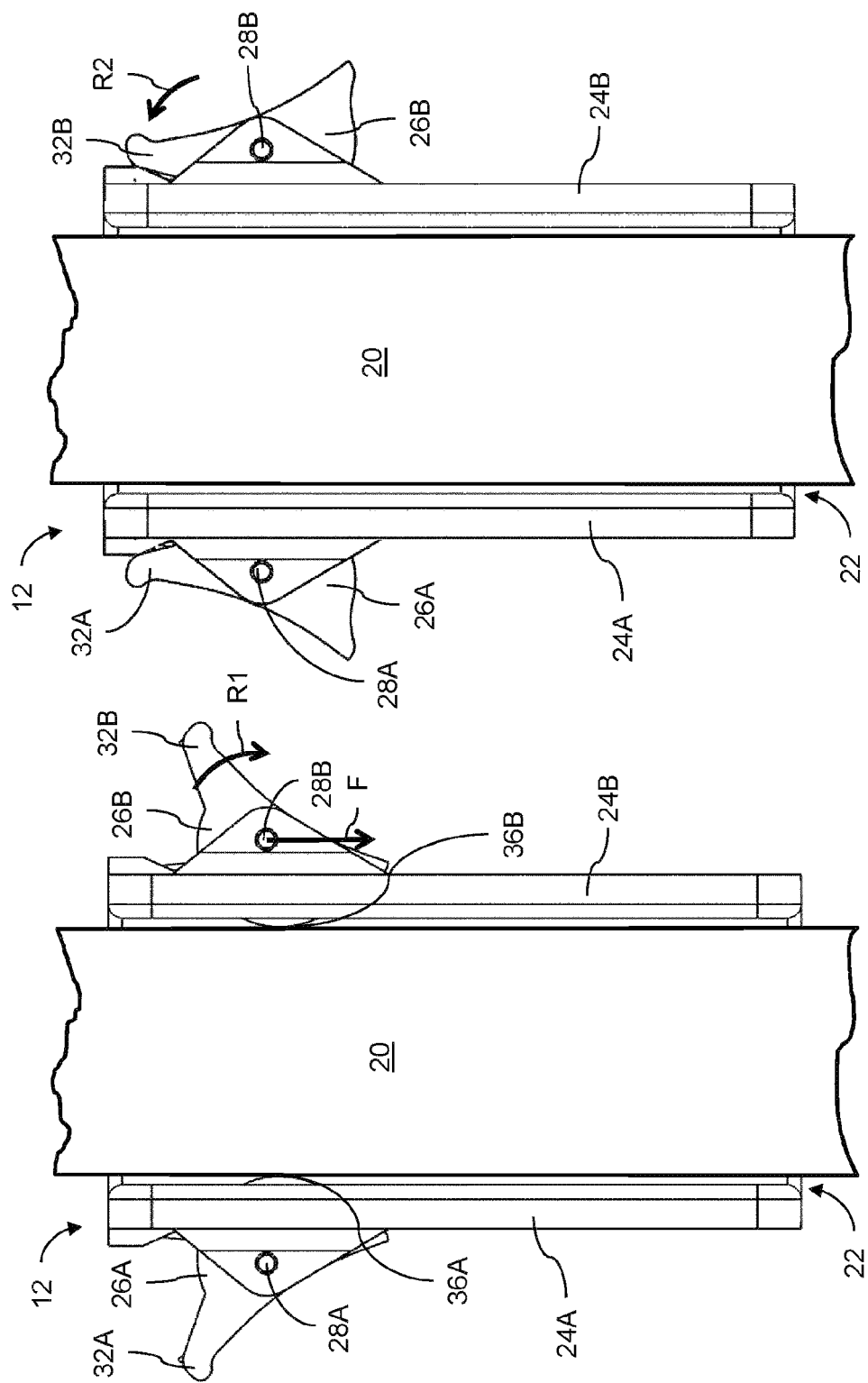
FIGS. 7A and 7B are rear elevation views of the bracket of FIG. 3 showing cams in engaged and released positions respectively.

FIGS. 7A and 7B are rear elevation views of bracket 12 of mount 10 showing first and second cams 26A, 26B in engaged and released positions respectively. During operation, bracket 12 may be attached to wall stud 20 by receiving wall stud 20 in channel 22 defined by bracket 12 (see also FIG. 4). In the engaged position, rotatable first and second cams 26A, 26B may engage laterally opposite sides of wall stud 20 and apply a clamping force on wall stud 20. A suitable storage component or object to be stored (i.e., hung on wall stud 20) may be attached to bracket 12 either directly or indirectly via accessory clip 14.

Cam surfaces 36A, 36B of respective first and second cams 26A, 26B may each include a curved surface rotatable about a respective rotation axes RA1 or RA2 (shown in FIG. 6). For example, cam surfaces 36A, 36B may each define part of a disk, cylinder or other irregular form that is eccentrically mounted for rotation about rotation axes RA1 or RA2. For example, as second cam 26B rotates in direction R1, cam surface 36B may increasingly advance (protrude) into channel 22 as shown in FIG. 7A to apply a clamping force onto wall stud 20. Alternatively, as second cam 26B rotates in the opposite direction R2, cam surface 36B may retract from channel 22 as shown in FIG. 7B to remove the clamping force from wall stud 20. It is understood that the same behaviour is applicable to first cam 26A except that mirror images of directions R1 and R2 would apply.

In some embodiments, first and second cams 26A, 26B may be biased toward their respective engaged positions by respective torsion springs 34A, 34B (shown in FIG. 6). Accordingly, first and second cams 26A, 26B may be manually actuated toward their respective released positions (e.g., using handles 32A, 32B) of FIG. 7B against the biasing force of torsion springs 34A, 34B when wall stud 20 is being received into channel 22. Once wall stud 20 is received in channel 22, first and second cams 26A, 26B may be permitted to move toward their respective engaged positions by releasing handles 32A, 32B and allowing torsion springs 34A, 34B to urge respective first and second cams 26A, 26B toward their respective engaged positions.

FIG. 7A shows arrow F representing a vertical downward force on pivot pin 28B associated with a load applied to bracket 12 and that is transmitted to wall stud 20. It is understood that a similar force may also be applied to pivot pin 28A in the embodiment shown. It is understood that force F tends to urge second cam 26B to rotate in direction R1. Accordingly, as the vertical downward load on bracket 12 is increased, a magnitude of the clamping force applied to wall stud 20 by first and second cams 26A, 26B may also be increased. Conversely, as the vertical downward load on bracket 12 is reduced, a magnitude of the clamping force applied to wall stud 20 by first and second cams 26A, 26B may also be reduced. Accordingly, bracket 12 may be removed from wall stud 20 by removing the downward load on bracket 12 and manually pivoting first and/or second cams 26A, 26B toward their respective released positions. Alternatively or in addition, the application of an upward force on bracket 12 may be used to cause first and second cams 26A, 26B to release wall stud 20.

As explained above, the configuration of first and second cams 26A, 26B may provide sufficient clamping force on wall stud 20 for some applications. However, it may be desirable to supplement the carrying capacity of bracket 12 by way of one or more screws 38 driven into wall stud 20 via fastener holes 40 as shown in FIG. 4.

Figure 8:
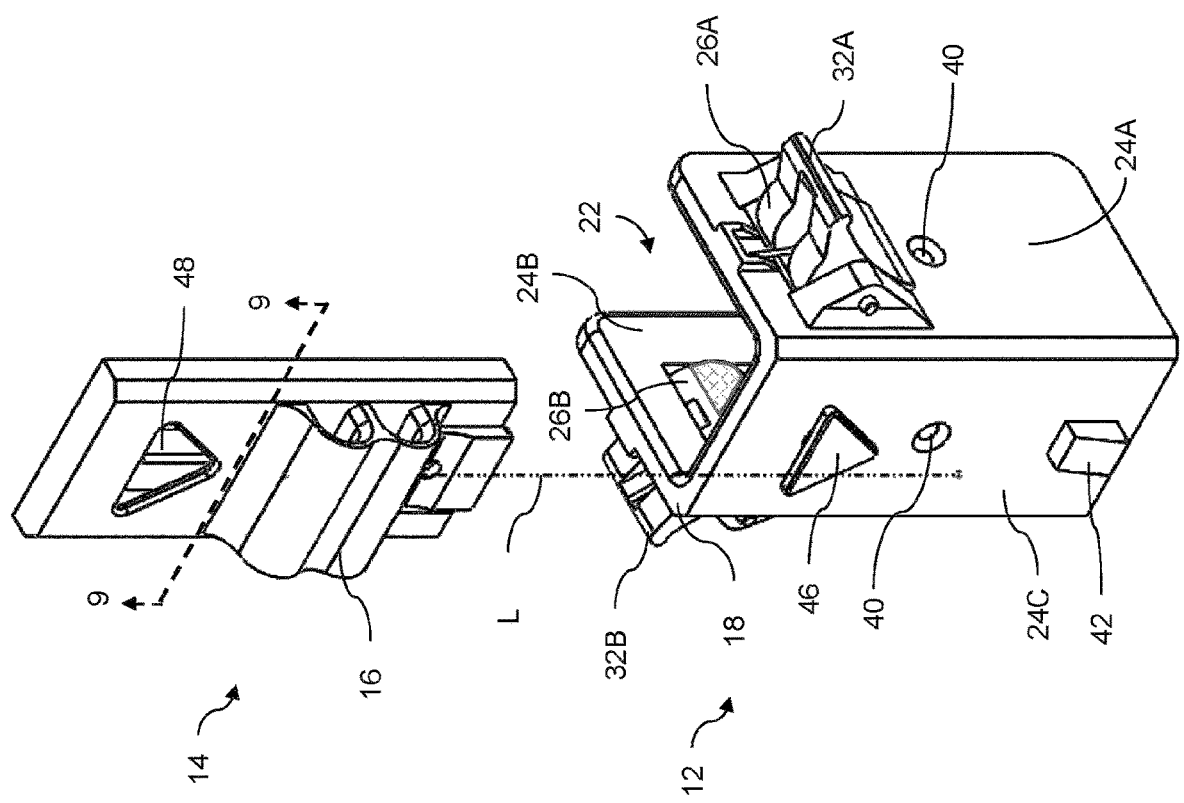
FIG. 8 is a perspective view showing an exemplary accessory clip separated from the bracket of FIG. 3.

FIG. 8 is a perspective view of mount 10 where accessory clip 14 is separated from bracket 12. When assembling accessory clip 14 to bracket 12, accessory clip 14 may be oriented and moved toward bracket 12 along line L (or alternatively, bracket 12 may be oriented and moved toward accessory clip 14 along line L) in order to cause engagement of anchor 46 with cooperating slot 44 (shown in FIG. 9). Accessory clip 14 and third wall 24C may be configured so that when accessory clip 14 is properly attached to bracket 12, anchor 46 may be visible through window 48 and provide a visual confirmation of attachment to the user.

Figure 10:
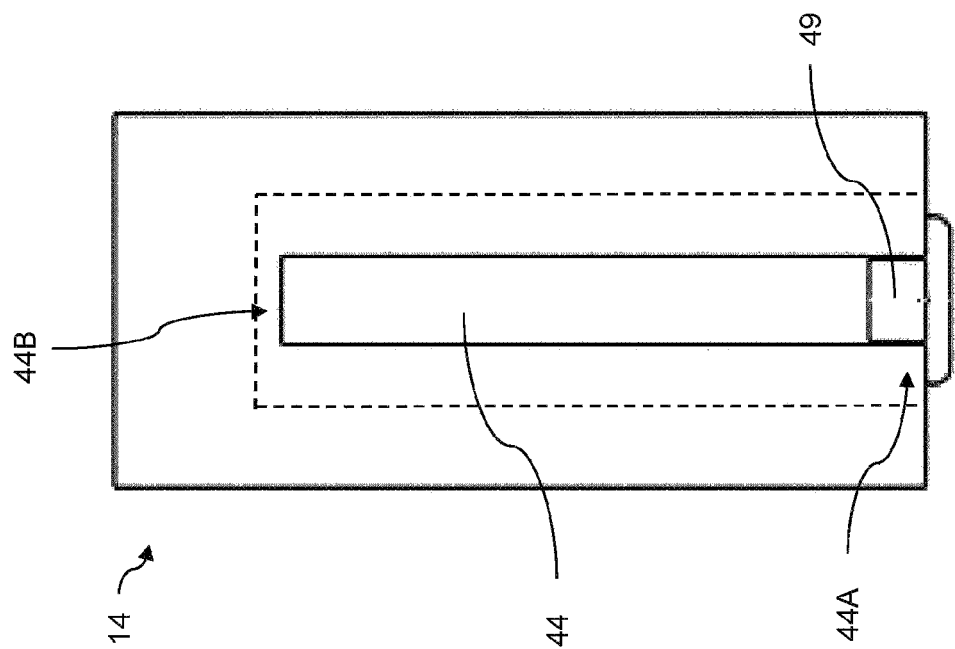
FIG. 10 is a rear elevation view of the accessory clip of FIG. 8.
Figure 9:
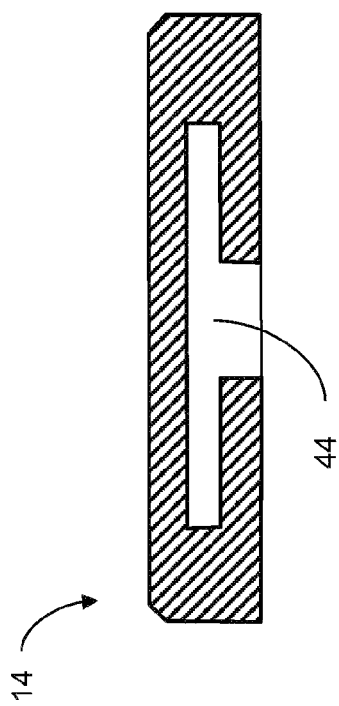
FIG. 9 is a cross-sectional view of the accessory clip of FIG. 8 taken along line 9-9 in FIG. 8.

FIG. 9 is a cross-sectional view of accessory clip 14 of FIG. 8 taken along line 9-9 in FIG. 8 and FIG. 10 is a rear elevation view of accessory clip 14 of FIG. 8. In reference to FIGS. 9 and 10, accessory clip 14 may include T-shaped slot 44 of a type also known as "T-slot" that is configured to receive and engage with anchor 46 which is secured to bracket 12 and which has a cooperating shape. FIG. 10 shows an outline of the internal boundary of slot 44 in broken lines. Slot 44 may extend along a portion of accessory clip 14. Slot 44 may have an open (e.g., lower) end 44A configured to permit anchor 46 to enter and exit slot 44 during attachment and removal of accessory clip 14 to/from bracket 12 along line L shown in FIG. 8. Slot 44 may have closed end 44B opposite of open end 44A.

Accessory clip 14 may also include stop surface 49 that is configured to allow passage of anchor 46 but interfere with the passage of boss 42 that is disposed on bracket 12. Accordingly, stop surface 49 and boss 42 may cooperate together to provide a hard stop limiting relative movement between accessory clip 14 bracket 12 along line L of FIG. 8.

Figure 11:
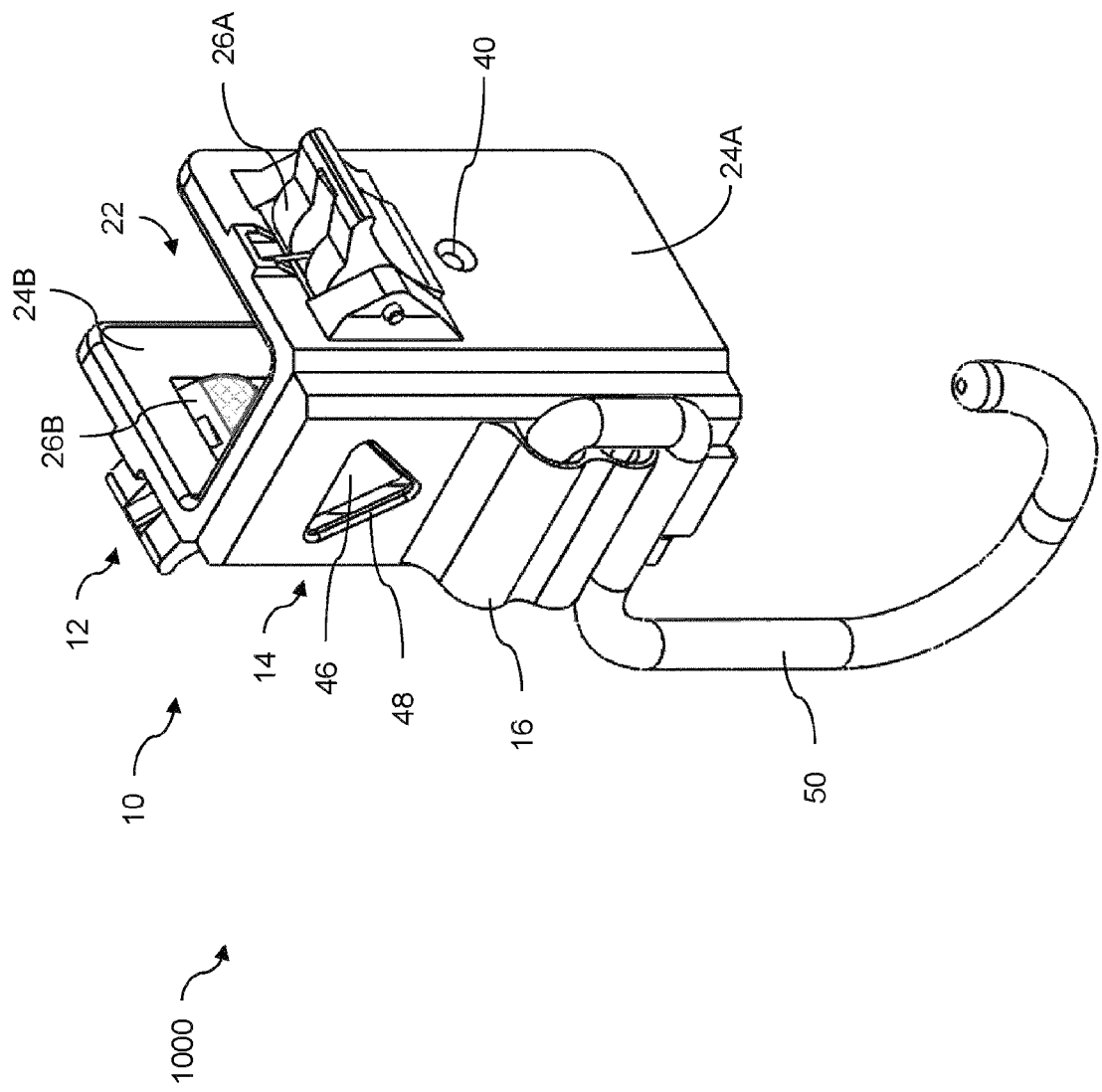
FIG. 11 is a perspective view of an exemplary organizational system including the mount.

FIG. 11 is a perspective view of an exemplary organizational system 1000 including mount 10 described above in combination with a storage component in the form of hook 50. Hook 50 may be releasably attached to mounting interface 16 of accessory clip 14 and used to hang an object to be stored.

Figure 12:
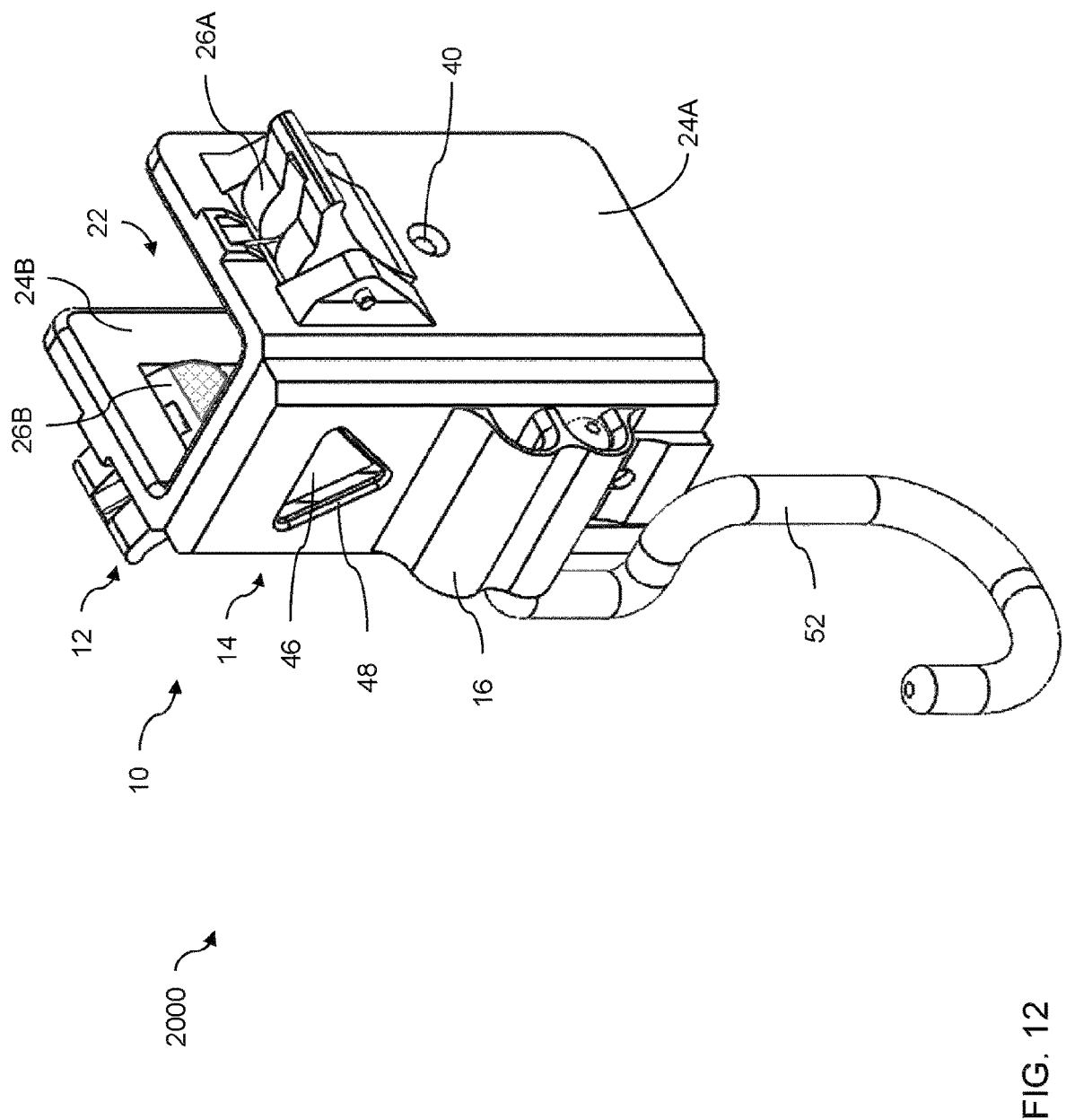
FIG. 12 is a perspective view of another exemplary organizational system including the mount.

FIG. 12 is a perspective view of another exemplary organizational system 2000 including mount 10 described above in combination with a storage component in the form of hook 52. Hook 52 may be releasably attached to mounting interface 16 of accessory clip 14 and used to hang an object to be stored.

Figure 13A:
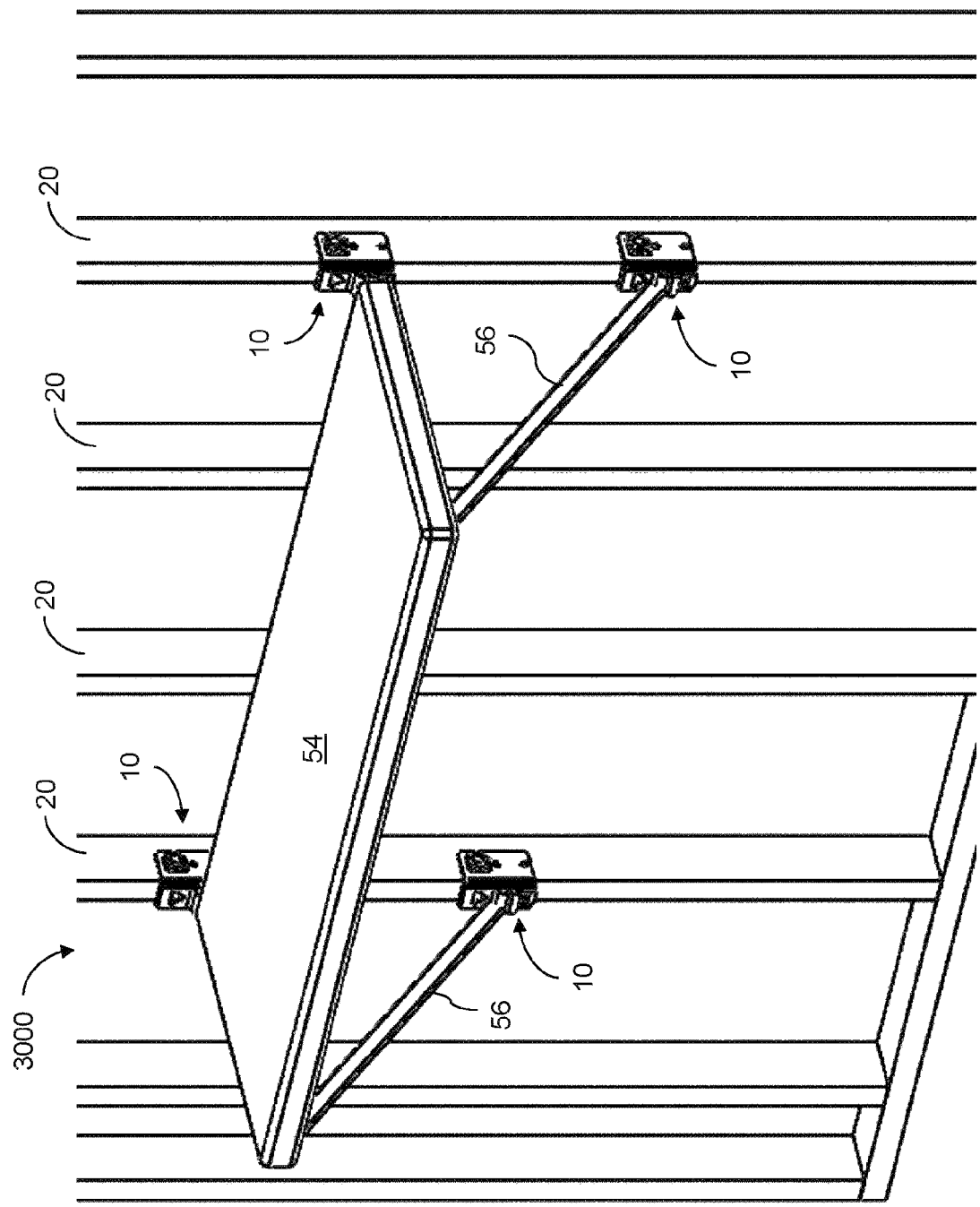
FIGS. 13A and 13B are perspective views of another exemplary organizational system including a plurality of mounts and a shelf shown as being deployed and stowed respectively.
Figure 13B:
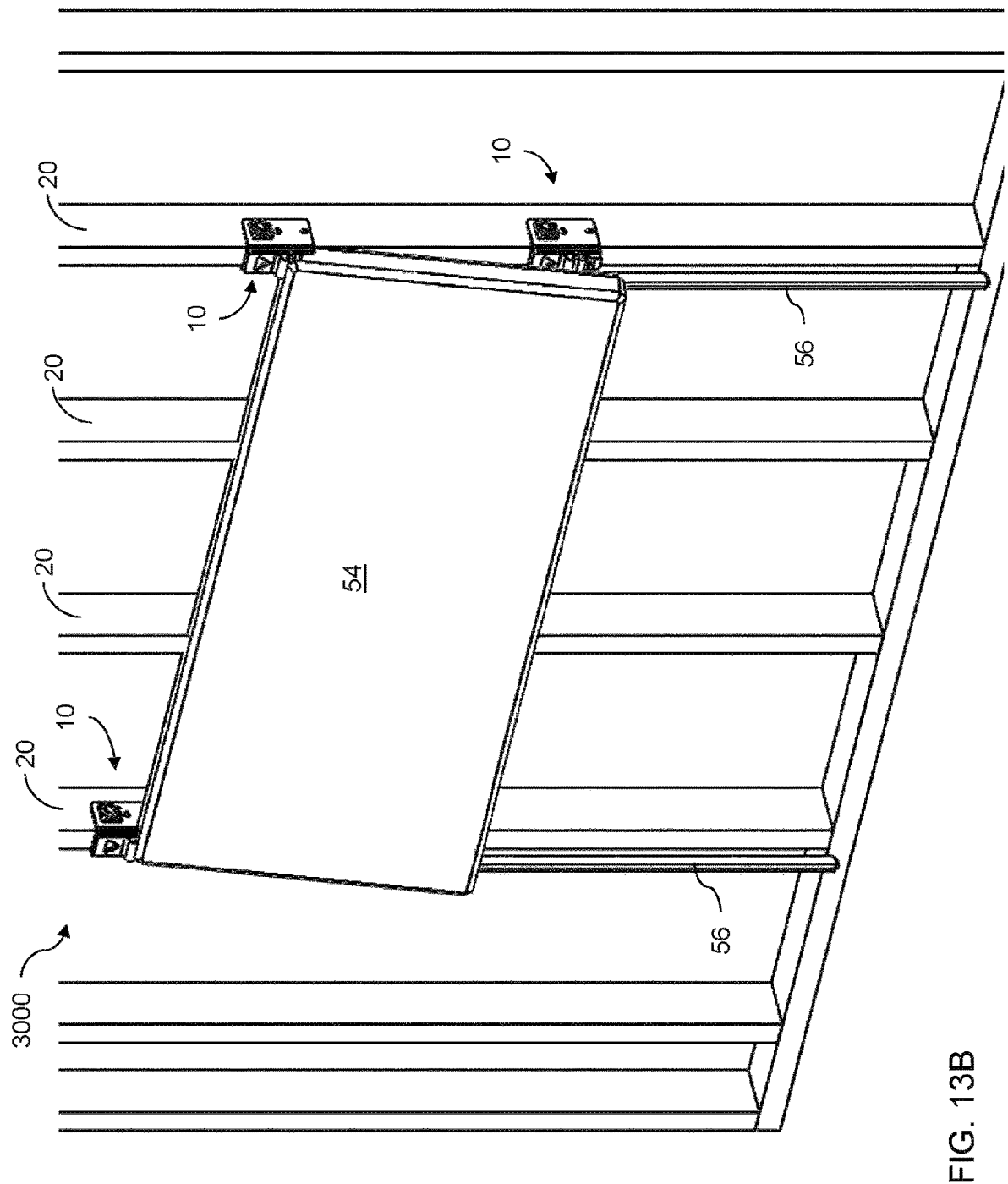

FIGS. 13A and 13B are perspective views of another exemplary organizational system 3000 including a plurality of mounts 10 as described above in combination with shelf 54. FIG. 13A shows shelf 54 having a deployed configuration and FIG. 13B shows shelf 54 having a stowed configuration. Shelf 54 may extend between different mounts 10 installed on different wall studs 20. An inboard side of shelf 54 may be supported by two laterally spaced apart upper mounts 10 attached to different wall studs 20. An outboard side of shelf 54 may be supported by two laterally spaced apart lower mounts 10 via respective braces 56. Shelf 54 and braces 56 may be attached to mounts 10 via suitable pin connections with mounting interfaces 16 of respective accessory clips 14.

Figure 14:
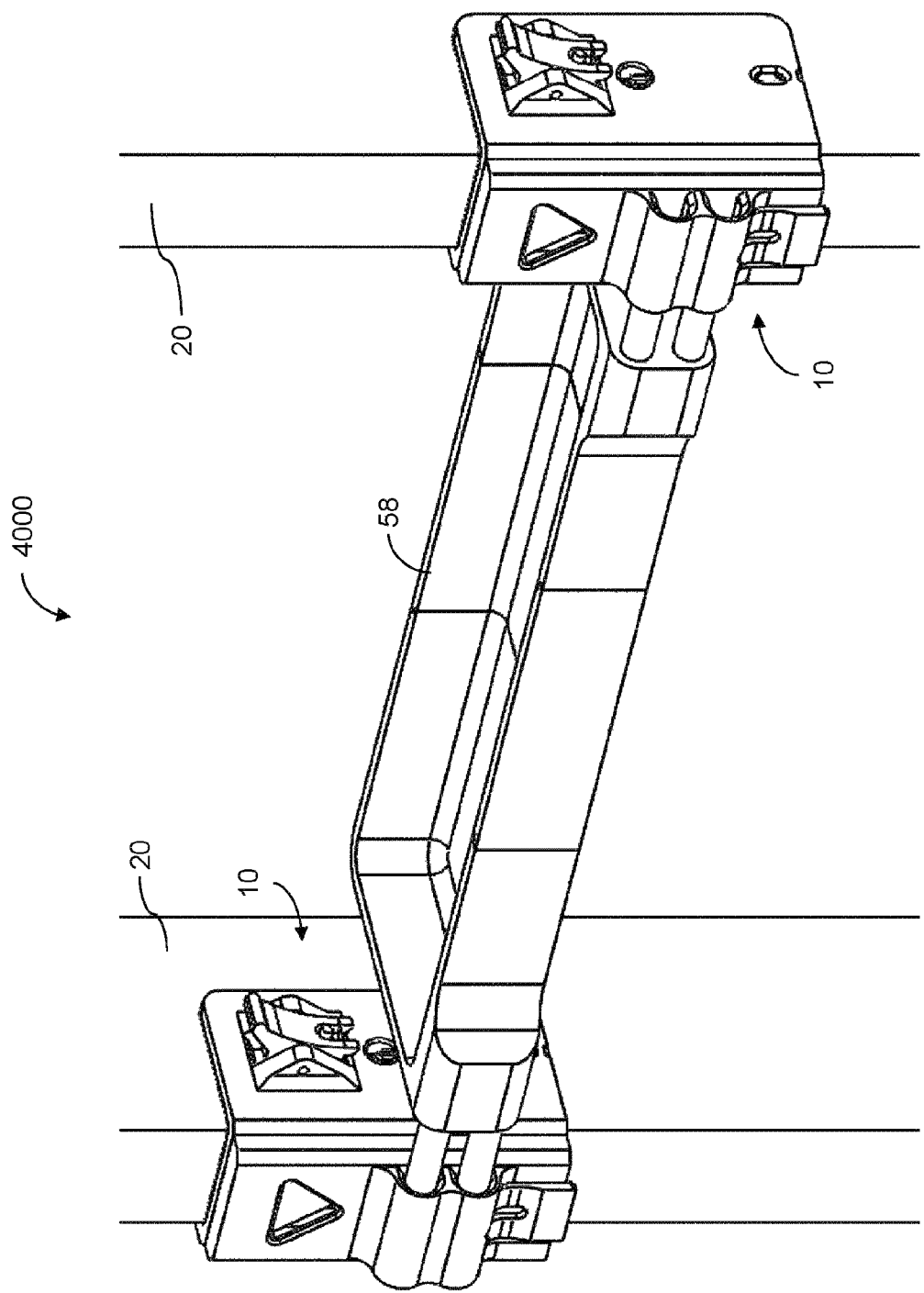
FIG. 14 is a perspective view of another exemplary organizational system including a plurality of mounts and a tray.

FIG. 14 is a perspective view of another exemplary organizational system 4000 including a plurality of mounts 10 as described above in combination with tray 58. Tray 58 may extend between different mounts 10 installed on adjacent wall studs 20. Tray 58 may be attached to mounts 10 via pin connections with mounting interfaces 16 of respective accessory clips 14. Tray 58 may be configured to extend rearwardly relative to mounting interfaces 16 in order to make efficient use of the space between the adjacent wall studs 20.

Figure 15:
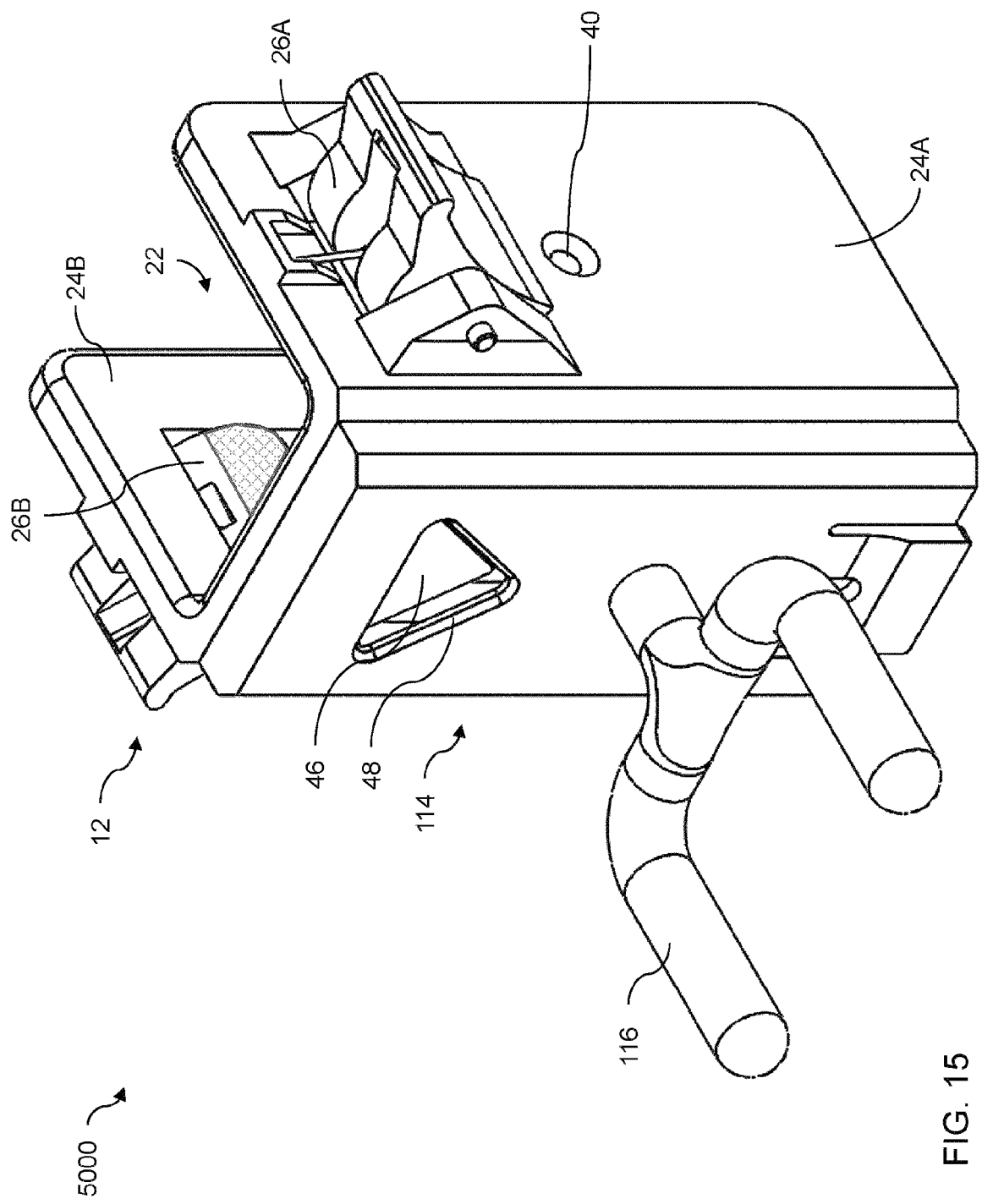
FIG. 15 is a perspective view of another exemplary organizational system including the mount.

FIG. 15 is a perspective view of another exemplary organizational system 5000 including a mount having bracket 12 as described above and accessory clip 114 according to another embodiment. In the illustrated embodiment, mounting interface 116 of accessory clip 114 may include a (e.g., guitar-type) hook. It is understood that bracket 12 may be used with accessory clips 14, 114 providing various types of mounting interfaces 16, 116.

Figure 16:
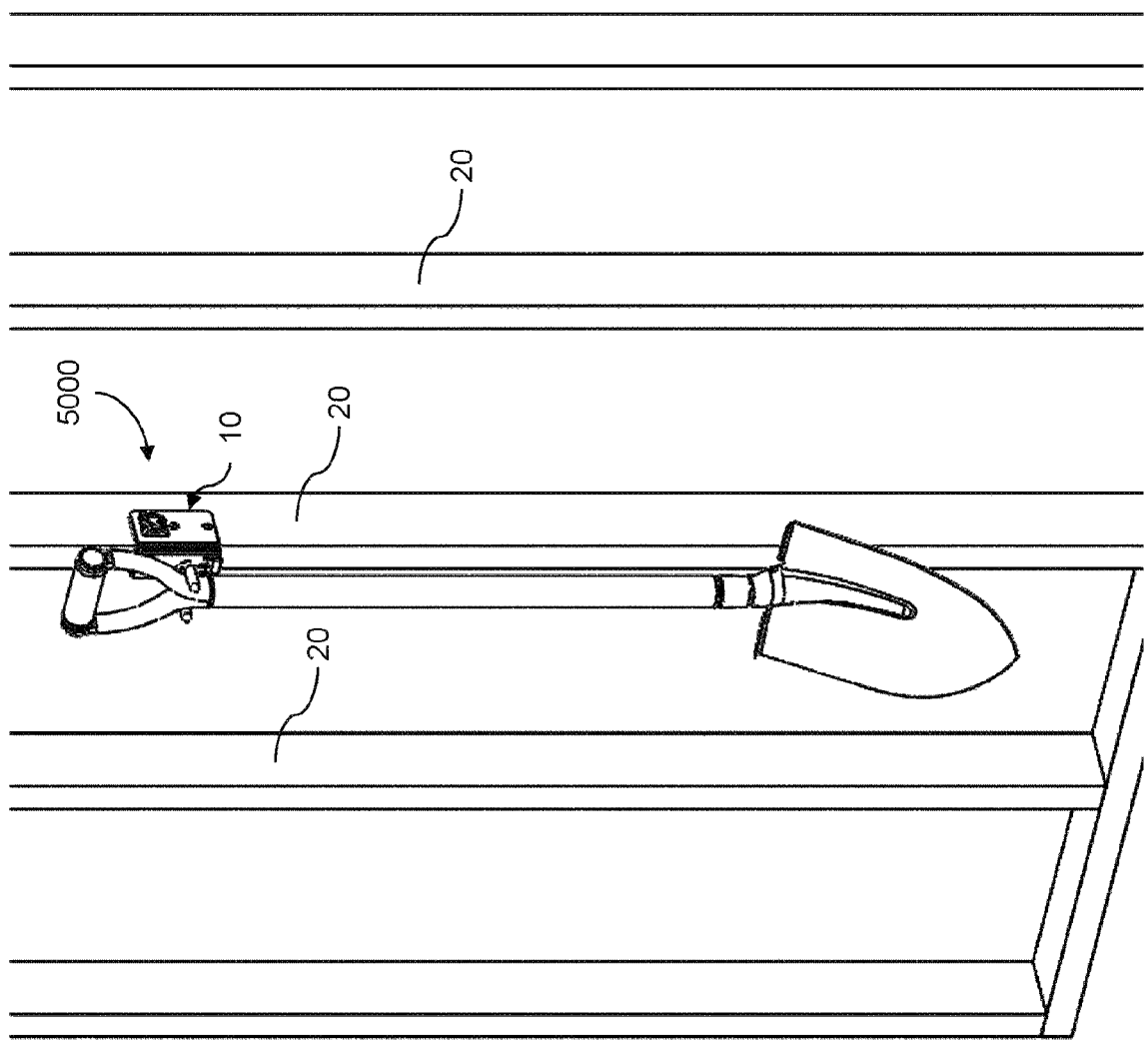
FIG. 16 is a perspective view of the organizational system of FIG. 15 in use.

FIG. 16 is a perspective view of organizational system 5000 of FIG. 15 in use where bracket 12 is attached to wall stud 20 and mounting interface 116 is used to hang a shovel.

Figure 17:
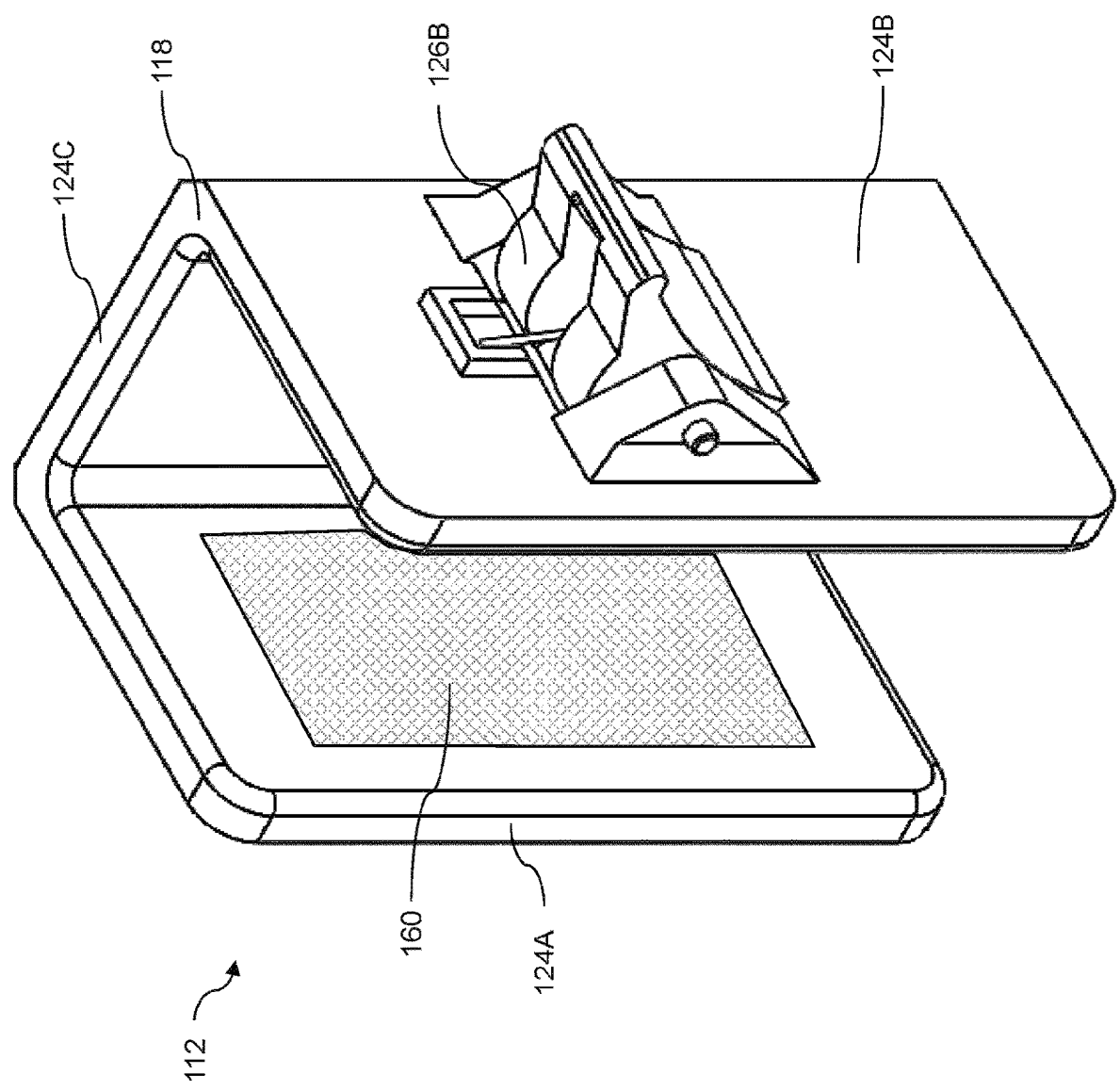
FIG. 17 is a perspective view of another exemplary bracket of the mount.

FIG. 17 is a perspective view of another exemplary bracket 112 according to another embodiment. Some aspects of bracket 112 may be generally identical to those of bracket 12 described above except for first cam 26A and fastener holes 40 being omitted from bracket 112. In relation to the description of bracket 12, like elements have been identified using like reference numerals that have been incremented by 100. Bracket 112 may include base 118, first wall 124A, second wall 124B and third wall 124C. Cam 126B may be rotatably coupled to second wall 124B and no cam may be rotatably coupled to first wall 124A. Cam 126B may function as described above in relation to second cam 26B. When bracket 112 is attached to wall stud 20, a clamping force onto wall stud 20 may be applied by cam 126B so that opposite sides of wall stud 20 are clamped between cam 126B and a channel-facing side of first wall 124A. In some embodiments, the channel-facing side of first wall 124A may include friction-enhancing surface 160.

Figure 18:
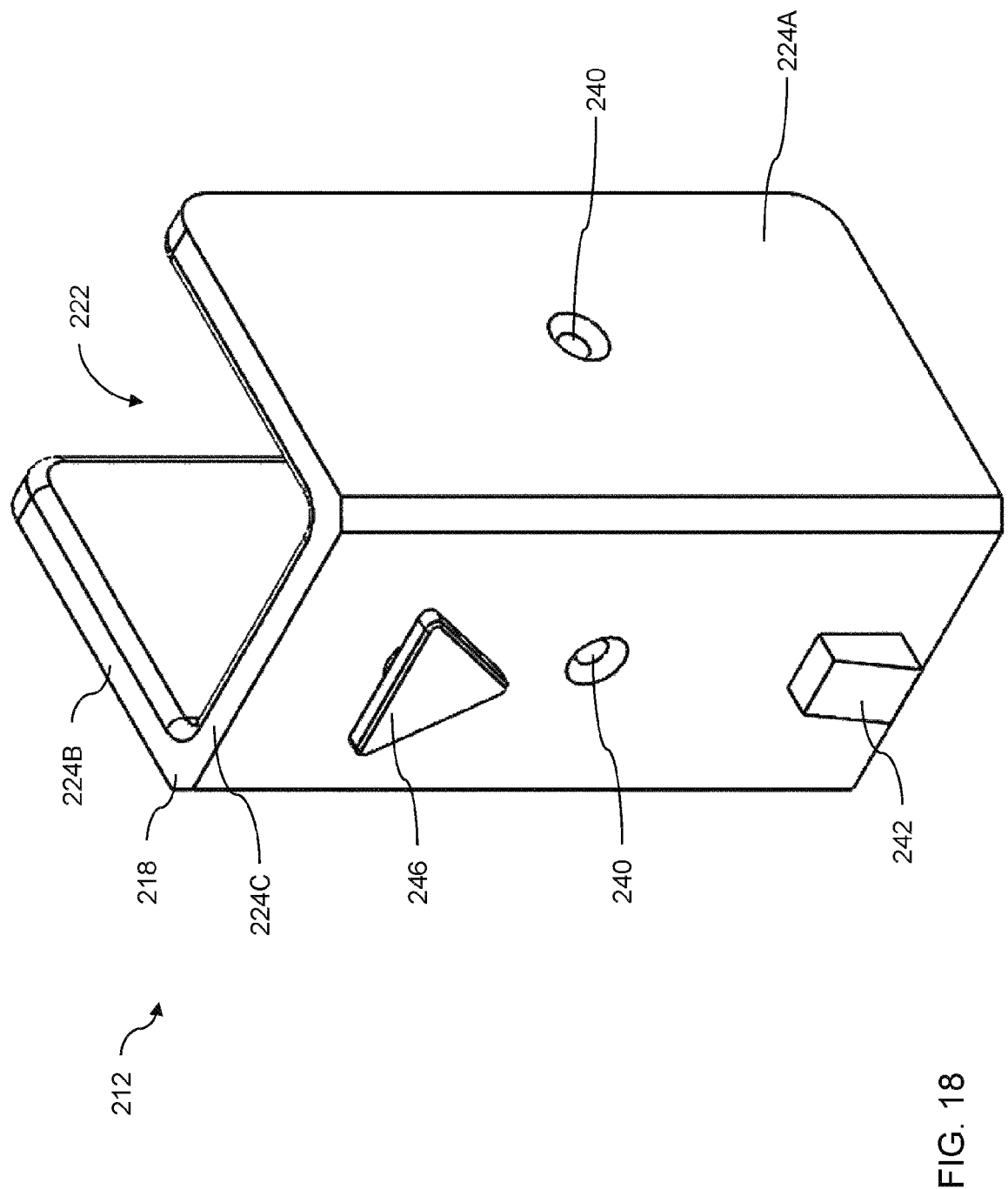
FIG. 18 is a perspective view of another exemplary bracket of the mount.

FIG. 18 is a perspective view of another exemplary bracket 212 according to another embodiment. Some aspects of bracket 212 may be generally identical to those of bracket 12 described above except for both first cam 26A and second cam 26B being omitted from bracket 212. In relation to the description of bracket 12, like elements have been identified using like reference numerals that have been incremented by 200. Bracket 212 may include base 218, first wall 224A, second wall 224B and third wall 224C. Bracket 212 may include boss 242 and anchor 246.

Bracket 212 may be attachable to vertical wall stud 20, a horizontal ceiling joist and/or an elongated member at some other orientation. A ceiling joist may be a substantially horizontal framing member in a building's structure and may be a fundamental framing element in buildings (e.g., houses, garages, sheds). A ceiling joist may span an open space of a building and subsequently transfer loads to vertical members such as wall studs 20. A ceiling joist may be made of wood, metal and/or other suitable structural material. Typically, a wood joist may have a cross section with the longer faces oriented vertically. When wall stud 20 or other elongated member is received in channel 222 of bracket 212, one or more suitable threaded fasteners such as screws 38 (shown in FIG. 4) may be used to attach bracket 212 onto the elongated member via corresponding one or more fastener holes 240.

Figure 19:
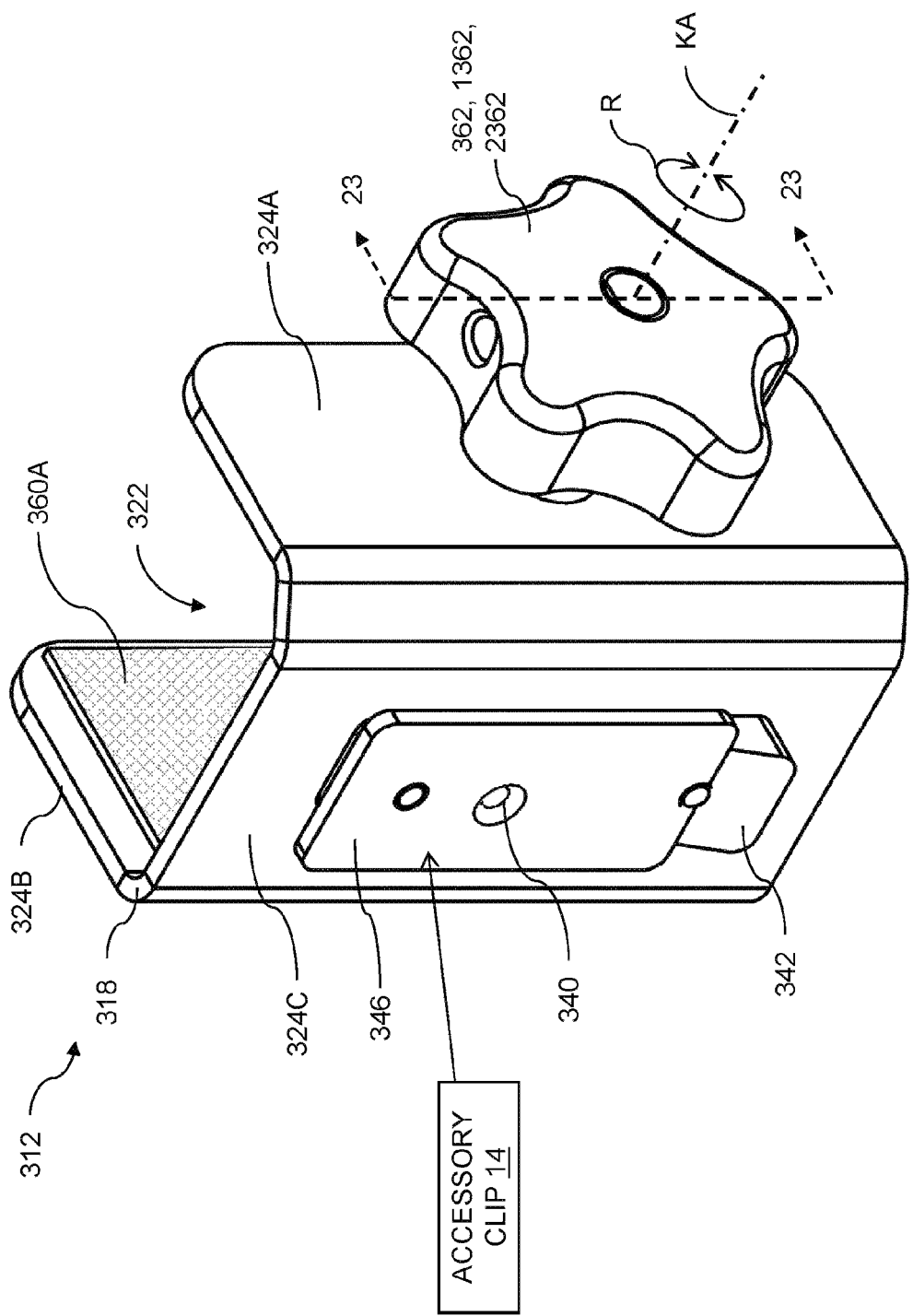
FIG. 19 is a perspective view of another exemplary bracket of the mount.

FIG. 19 is a perspective view of another exemplary bracket 312 according to another embodiment. Bracket 312 may be attachable to vertical wall stud 20, horizontal ceiling joist 68, track 84 (also shown in FIG. 37) and/or an elongated member at some other orientation. Aspects of bracket 312 may be generally identical to those of bracket 12 described above except for both first cam 26A and second cam 26B being omitted from bracket 312 and replaced with a suitable clamping mechanism including rotatable knob 362. In relation to the description of bracket 12, like elements have been identified using like reference numerals that have been incremented by 300. Bracket 312 may be used with accessory clip 14 (shown schematically in FIG. 19) and/or any other storage component(s) disclosed herein. Bracket 312 may be used individually or in combination with one or more other brackets including those disclosed herein to provide an organizational system for attachment to a wall or ceiling with one or more exposed elongated members. Bracket 312 may be used instead of bracket 12 in any of organizational systems 1000, 2000, 3000, 4000 and 5000 described herein.

When the elongated member is received in channel 322 of bracket 312, a suitable clamping force may be applied to the elongated member by the rotation of knob 362 about knob axis KA as explained below and illustrated by arrow R in FIG. 19. In some embodiments, bracket 312 may include base 318, first wall 324A, second wall 324B, and third wall 324C. Bracket 312 may include a suitable clip interface for the releasable attachment of accessory clip 14 to bracket 312. Such clip interface may be provided on third wall 324C. The clip interface may, for example, include anchor 346 protruding from third wall 324C. In some embodiments, anchor 346 could instead have the shape of anchor 246 shown in FIG. 18. In some embodiments, bracket 312 may include boss 342 protruding from third wall 324C. Boss 342 may interact with accessory clip 14 and provide a hard stop limiting downward movement of accessory clip 14 relative to bracket 312. In some embodiments, bracket 312 may include one or more optional fastener holes 340 extending through any of first wall 324A, second wall 324B, and third wall 324C.

FIG. 20 is a top plan view of bracket 312. The clamping mechanism of bracket 312 may include clamp foot 364, stem 366 and knob 362. Knob 362 may be drivingly coupled to clamp foot 364. Knob 362 may be attached to (e.g., in torque transmitting engagement with) stem 366. Stem 366 may extend through first wall 324A. Stem 366 may include a threaded portion (e.g., stem 366 may include a threaded rod) threadably engaged with first wall 324A and/or with nut 390 attached to (e.g., welded or integrally formed with) first wall 324A so that rotation of knob 362 and stem 366 may be converted to translation of stem 366 and clamp foot 364 relative to first wall 324A along knob axis KA as shown by arrow CF.

Clamp foot 364 may be disposed inside channel 322 and engaged with an end of stem 366 opposite of knob 362 so that translation of stem 366 causes translation of clamp foot 364 along knob axis KA. Using the clamping mechanism shown in FIG. 20, rotation of knob 362 in one direction may cause clamp foot 364 to engage and apply a clamping force onto the elongated member, and, rotation of knob 362 in an opposite direction may cause clamp foot 364 to release the elongated member. In other words, clamp foot 364 may be translatable between an engaged position and a released position to respectively engage and release the elongated member received in channel 322.

It is understood that clamp foot 364 providing a relatively large surface area for engagement with the elongated member is optional and may prevent damage from being caused to the elongated member. Alternatively, the end of stem 366 may directly engage with the elongated member.

In the embodiment shown, the elongated member may be clamped between second wall 324B and clamp foot 364. In some embodiments, an inside surface of second wall 324B facing channel 322 may include friction-enhancing surface 360B such as friction-enhancing surface 60 described above. Alternatively or in addition, in some embodiments, clamp foot 364 may include (i.e., opposing) friction-engaging surface 360A for engaging an opposite side of the elongated member for example.

Figure 24A:
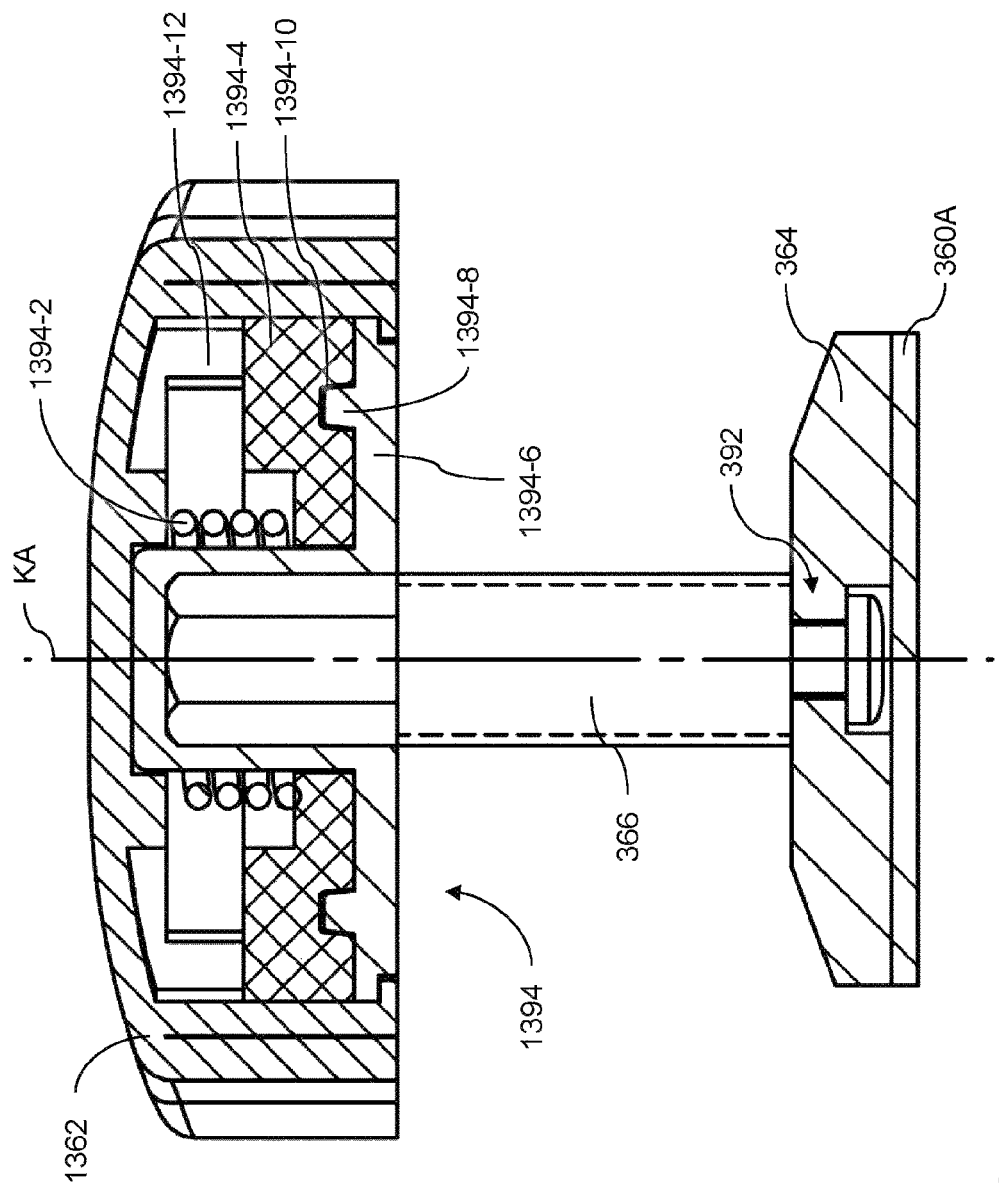
FIG. 24A is a cross-sectional view taken along line 23-23 in FIG. 19 of an assembly including the rotatable knob of FIG. 19 and another exemplary torque limiter.

Stem 366 may be connected to clamp foot 364 via swivel connection 392 (an example of which being shown in FIG. 24A). Accordingly, axial displacement of stem 366 along knob axis KA may consequently cause corresponding axial displacement of clamp foot 364. Knob axis KA may be substantially parallel to the translation direction of clamp foot 364. However, swivel connection 392 may permit relative rotation between clamp foot 364 and stem 366 about knob axis KA. For example, the end of stem 366 may include a portion (e.g., protrusion) that is received and retained into a cooperating socket formed in clamp foot 364.

FIGS. 21 and 22 respectively show a left side elevation view of bracket 312 and a right side elevation view of bracket 312.

Figure 23:
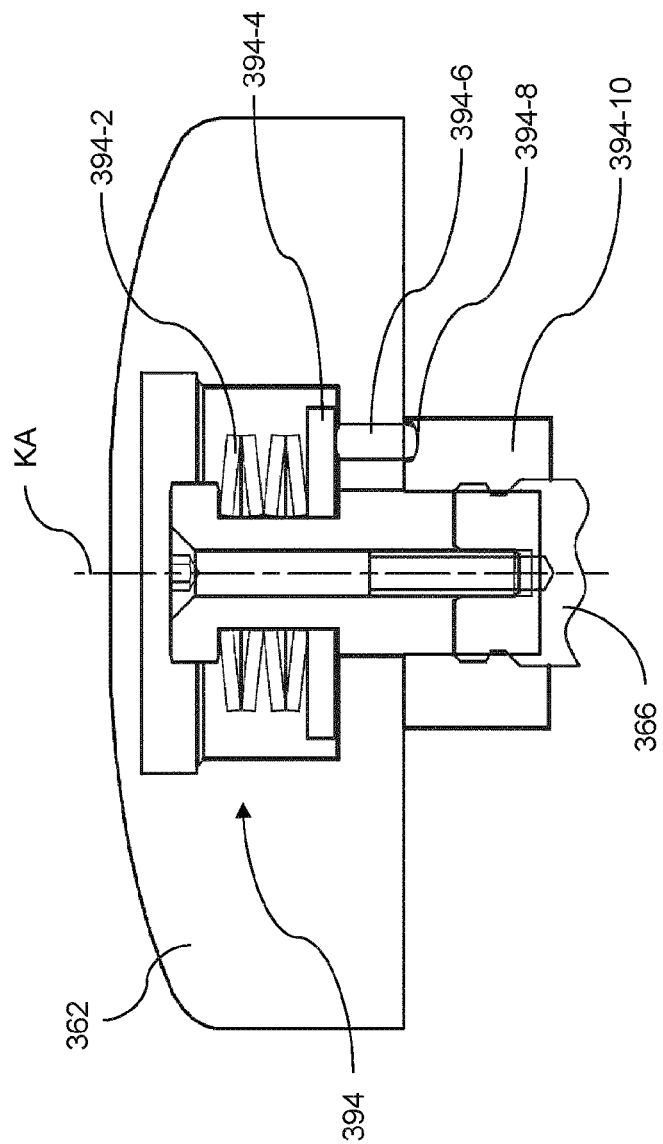
FIG. 23 is a cross-sectional view taken along line 23-23 in FIG. 19 of an exemplary rotatable knob of the bracket of FIG. 19 including an exemplary torque limiter.

FIG. 23 is a cross-sectional view taken along line 23-23 in FIG. 19 of knob 362 of bracket 312. In some embodiments, knob 362 may be in torque-transmitting engagement with stem 366 via an optional torque limiter 394. Elements of torque limiter 394 are shown as an example only and it is understood that other types of torque limiters (also known as "overload clutches") may be suitable. Examples of suitable torque limiters may include "ball detent" torque limiters, "pawl and spring" torque limiters, and "friction plate" torque limiters. Torque limiter 394 may prevent an excessive torque input being applied to the clamping mechanism of bracket 312. In various embodiments, torque limiter 394 may limit the torque by allowing slipping of knob 362 relative to stem 366. Torque limiter 394 may hinder or prevent damage to bracket 312 and/or to the elongated member due to overloading for example.

In reference to FIG. 23, torque limiter 394 may include one or more (e.g., Belleville, helical) springs 394-2 urging thrust washer 394-4 and pin 394-6 attached thereto axially downward so that pin 394-6 may be engaged with recess 394-8 formed in disk 394-10. Disk 394-10 may be in torque-transmitting engagement with stem 366 via a splined connection for example. Thrust washer 394-4 may be in torque-transmitting engagement with knob 362 by way of pin 394-6 extending through and being engaged with a hole formed in knob 362. The axial force exerted on thrust washer 394-4 by spring(s) 394-2 may be calibrated based on a prescribed threshold torque value not to be exceeded.

During operation of torque limiter 394, when the torque applied to knob 362 is below the prescribed threshold, the axial force applied to thrust washer 394-4 by spring(s) 394-4 urges pin 394-6 to remain engaged with recess 394-8 in disk 394-10 and thereby causes the torque applied to knob 362 to be transmitted to stem 366. However, when the torque applied to knob 362 reaches or exceeds the prescribed threshold, disk 394-10 urges pin 394-6 upwardly and overcomes the axial force applied by spring(s) 394-4. This causes pin 394-6 to slip out of recess 394-8 and consequently causes knob 362 to slip relative to stem 366 until pin 394-6 reaches another or the same recess 394-8 formed on disk 394-10. Pin 394-6 and recess 394-8 may be shaped (e.g., rounded and/or tapered) so that the torque limiting function occurs in both directions or only in one direction so that clamp foot 364 may be loosened in case of tightening to the prescribed torque threshold. The threshold torque limit may be selected to provide an acceptable clamping performance of bracket 312 on the elongated member while staying within the structural limits of bracket 312.

In some embodiments, torque limiter 394 may provide indication 396 (shown in FIG. 26B) to a user when the prescribed torque threshold has been reached or exceeded. Indication 396 may be a haptic and/or visual cue provided by or indicative of knob 362 slipping relative to stem 366. Alternatively or in addition, indication 396 may be an audible cue (e.g., clicking sound) made by pin 394-6 slipping out of and/or back into recess 394-8 for example.

FIG. 24A is a cross-sectional view taken along line 23-23 in FIG. 19 of an assembly including the knob 1362, another exemplary torque limiter 1394, stem 366 and clamp foot 364. FIG. 24B is a perspective exploded view of the assembly of FIG. 24A. Torque limiter 1394 may be a face clutch style torque limiter. Torque limiter 1394 may include clutch spring 1394-2, clutch receiver 1394-4 and clutch plate 1394-6.

In reference to FIGS. 24A and 24B, clutch springs 1394-2 may urge clutch receiver 1394-4 toward and against clutch plate 1394-6 so that one or more dogs 1394-8 formed on clutch plate 1394-6 may be engaged with corresponding respective pockets 1394-10 formed in clutch receiver 1394-4. Clutch plate 1394-6 may be in torque-transmitting engagement with stem 366 via a hexagonal or other type of coupling. Clutch receiver 1394-4 may be in torque-transmitting engagement with knob 1362 by way of one or more fins 1394-12 of knob 1362 being engaged with corresponding respective notches 1394-14 formed in clutch receiver 1394-4. The axial force exerted on clutch receiver 1394-4 by clutch spring 1394-2 may be calibrated based on a prescribed threshold torque not to be exceeded.

During operation of torque limiter 1394, when the torque applied to knob 1362 is below the prescribed threshold, the axial force applied to clutch receiver 1394-4 by clutch spring 1394-2 urges dogs 1394-8 of clutch plate 1394-6 to remain engaged with pockets 1394-10 in clutch receiver 1394-4 and thereby causes the torque applied to knob 1362 to be transmitted to stem 366. However, when the torque applied to knob 1362 reaches or exceeds the prescribed threshold torque value, clutch plate 1394-6 urges clutch receiver 1394-4 upwardly (due to the interaction between dogs 1394-8 and pockets 1394-10) and overcomes the axial force applied by clutch spring 1394-2. This causes dogs 1394-8 to slip out of pockets 1394-10 and consequently causes knob 1362 to slip relative to stem 366 until dogs 1394-8 reach another set of pockets 1394-10 formed in clutch receiver 1394-4. Dogs 1394-8 and pockets 1394-10 may be shaped (e.g., rounded and/or tapered) so that the torque limiting function occurs in both directions or only in one direction so that clamp foot 364 may be loosened in case of tightening to the prescribed torque threshold.

In some embodiments, torque limiter 1394 may provide indication 396 (shown in FIG. 26B) to a user when the prescribed torque threshold has been reached or exceeded. Indication 396 may be a haptic and/or visual cue provided by or indicative of knob 1362 slipping relative to stem 366. Alternatively or in addition, indication 396 may be an audible cue (e.g., clicking sound) made by dogs 1394-8 slipping out of and/or back into recess pockets 1394-10 for example.

Figures 25A, 25B:
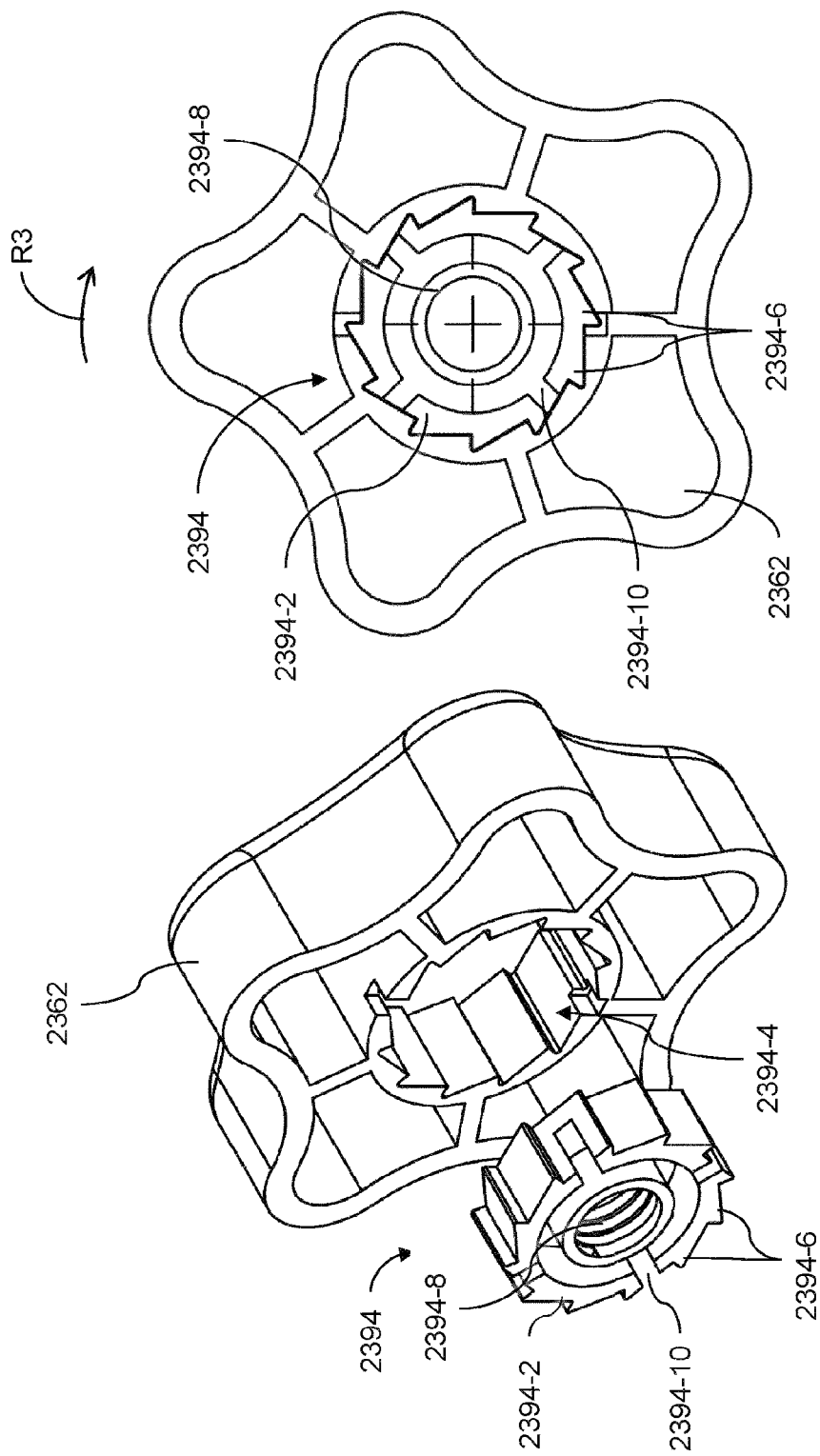
FIG. 25A is perspective exploded view of another exemplary torque limiter associated with the rotatable knob of the bracket of FIG. 19.
FIG. 25B is a bottom view of the torque limiter and rotatable knob of FIG. 25A.

FIG. 25A is perspective exploded view of another exemplary torque limiter 2394 that may be associated with rotatable knob 2362 of bracket 312. FIG. 25B is a bottom view of torque limiter 2394 and knob 2363. Torque limiter 2394 may include toothed ring 2394-2 received in receptacle 2394-4 formed in knob 2362. Toothed ring 2394-2 may include a plurality of teeth 2394-6 extending radially outwardly from toothed ring 2394-2 and that may be circumferentially distributed about toothed ring 2394-2. Toothed ring 2394-2 may have a threaded central bore 2394-8 for engagement with stem 366. Toothed ring 2394-2 may include one or more slots 2394-10 formed therein to permit resilient radially inward flexing of toothed ring 2394-2. The structure of toothed ring 2394-2 including the sizing and distribution of slots 2394-10 may be selected to provide a prescribed amount of radially-inward flexing based on a prescribed threshold torque.

An inner shape/outline of receptacle 2394-4 may substantially conform to an outer shape/outline of toothed ring 2394-2 so that knob 2362 may mesh with and be in torque-transmitting engagement with toothed ring 2394-2. Teeth 2394-6 of toothed ring 2394-2 may be asymmetric so that each tooth 2394-6 may have a first face having a relatively shallow slope and a second opposite face having a relatively steep slope.

During operation of torque limiter 2394, when the torque applied to knob 2362 in direction R3 is below the prescribed threshold, the torque is transmitted from knob 2362 to the first faces of shallow slope of teeth 2394-6 and thereby causes the torque applied to knob 2362 to be transmitted to stem 366. However, when the torque applied to knob 2362 reaches or exceeds the prescribed threshold torque, the first faces of shallow slope of teeth 2394-6 may cause resilient radial inward deflection of toothed ring 2394-2 to the point where teeth 2394-6 become disengaged with the inner profile of receptacle 2394-4. This may cause knob 2362 to slip relative to toothed ring 2394-2 and to stem 366 until the input torque is reduced and toothed ring 2394-2 radially expands to its resting shape within receptacle 2394-4. Teeth 2394-6 and the inner profile of receptacle 2394-4 may be shaped so that the torque limiting function occurs in both directions or only in one direction so that clamp foot 364 may be loosened in case of tightening to the prescribed torque threshold.

In some embodiments, torque limiter 2394 may provide indication 396 (shown in FIG. 26B) to a user when the prescribed torque threshold has been reached or exceeded. Indication 396 may be a haptic and/or visual cue provided by or indicative of knob 2362 slipping relative to stem 366. Alternatively or in addition, indication 396 may be an audible cue (e.g., clicking sound) made by teeth 2394-6 slipping relative to the inner profile of receptacle 2394-4.

Figure 26C:
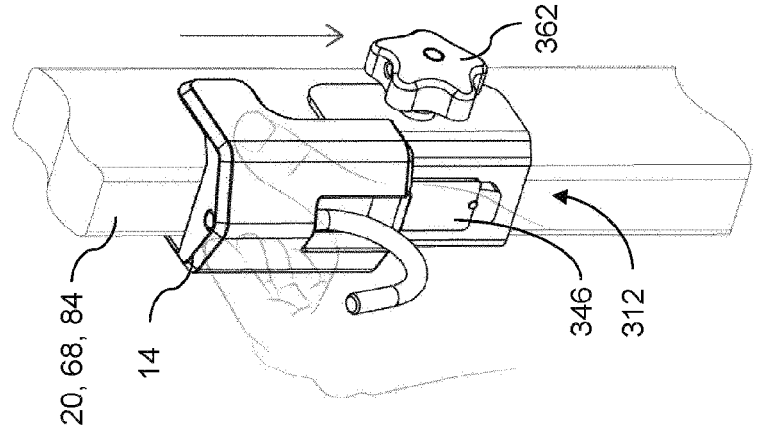
FIGS. 26A-26C illustrate a method of mounting a storage component to an elongated member of a wall or ceiling.
Figure 26B:
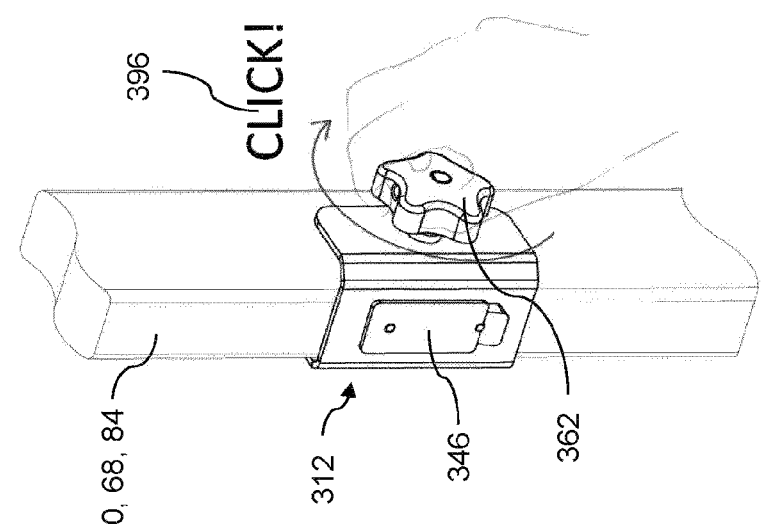
Figure 26A:
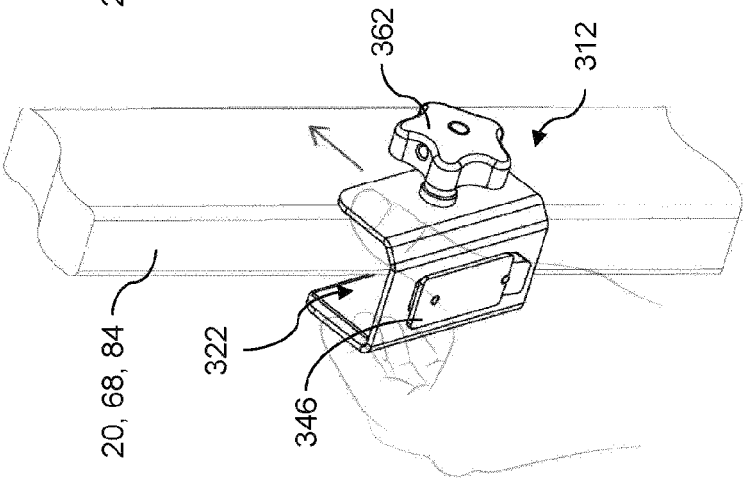

FIGS. 26A-26C illustrate a method of mounting a storage component to an elongated member using bracket 312 by a user. In reference to FIG. 26A, the elongated member may be received in channel 322 defined by bracket 312. In reference to FIG. 26B, clamp foot 364 (shown in FIG. 20) may be translated (e.g., via rotation of knob 362) from a released position to an engaged position to engage the elongated member received in channel 322 and thereby cause clamping of the elongated member between second wall 324B and clamp foot 364 as shown in FIG. 20. In other words, rotational movement of knob 362 may be converted to provide translation of clamp foot 364. Torque transfer between knob 362 and a connection (e.g., stem 366) between knob 362 and clamp foot 364 may be established via a torque limiter. Indication 396 (e.g., clicking noise) may optionally be provided to a user of bracket 312 when a torque input to knob 362 is equal to or exceeds the prescribed torque value.

In reference to FIG. 26C, a storage component may be (e.g., releasably) attached to bracket 312. In some embodiments, the storage component may be attached or integrated with accessory clip 14 which in turn may be releasably attached to bracket 12.

In some situations, a plurality of brackets 312 may be installed on the same or different elongated members and such brackets 312 may be used to cooperatively support a common storage component. For example, a shelf or tray may be supported by two or more brackets 312 similar to what is shown in FIGS. 13A, 13B and 14.

FIGS. 27 and 28 are perspective views of another exemplary bracket 412 according to another embodiment. Bracket 412 may be attachable to vertical wall stud 20, a horizontal ceiling joist 68, track 84 and/or an elongated member at some other orientation. Some aspects of bracket 412 may be generally identical to those of bracket 12 described above except for second cam 426B having a rotation axis RA2 oriented obliquely to channel axis CA in bracket 412, and except for first cam 26A being omitted from bracket 412. In relation to the description of bracket 12, like elements have been identified using like reference numerals that have been incremented by 400.

It is understood that, in some embodiments, bracket 412 could include another cam rotatably coupled to first wall 424A in addition to cam 426B being rotatably coupled to second wall 424B. Alternatively, instead of such other cam being rotatably coupled to first wall 424A, friction-enhancing surface 460 could be provided on channel-facing side of first wall 424A. Although not shown in FIG. 27, bracket 412 could include fastener holes.

Bracket 412 may include base 418, first wall 424A, second wall 424B and third wall 424C. Cam 426B may function as described above in relation to second cam 26B. However, the oblique orientation of cam 426B may permit bracket 412 to be attached to elongated members at vertical, horizontal or other orientations. When wall stud 20 or other elongated member is received in channel 422 of bracket 412, a clamping force onto the elongated member may be applied by cam 426B so that opposite sides of the elongated member are clamped between cam 426B and the channel-facing side of first wall 424A. Anchor 446 of bracket 412 may have a different configuration than anchor 46 of bracket 412 but may still be configured to engage with slot 44 (shown in FIGS. 9 and 10) formed in accessory clip 14.

FIG. 29 is left side elevation view of bracket 412 and FIG. 30 is top plan view of bracket 412 where the substantially U-shaped profile defined by first wall 424A, second wall 424B and third wall 424C is shown. FIG. 30 also illustrates cam surface 436B of cam 426B protruding into channel 422.

Figure 31:
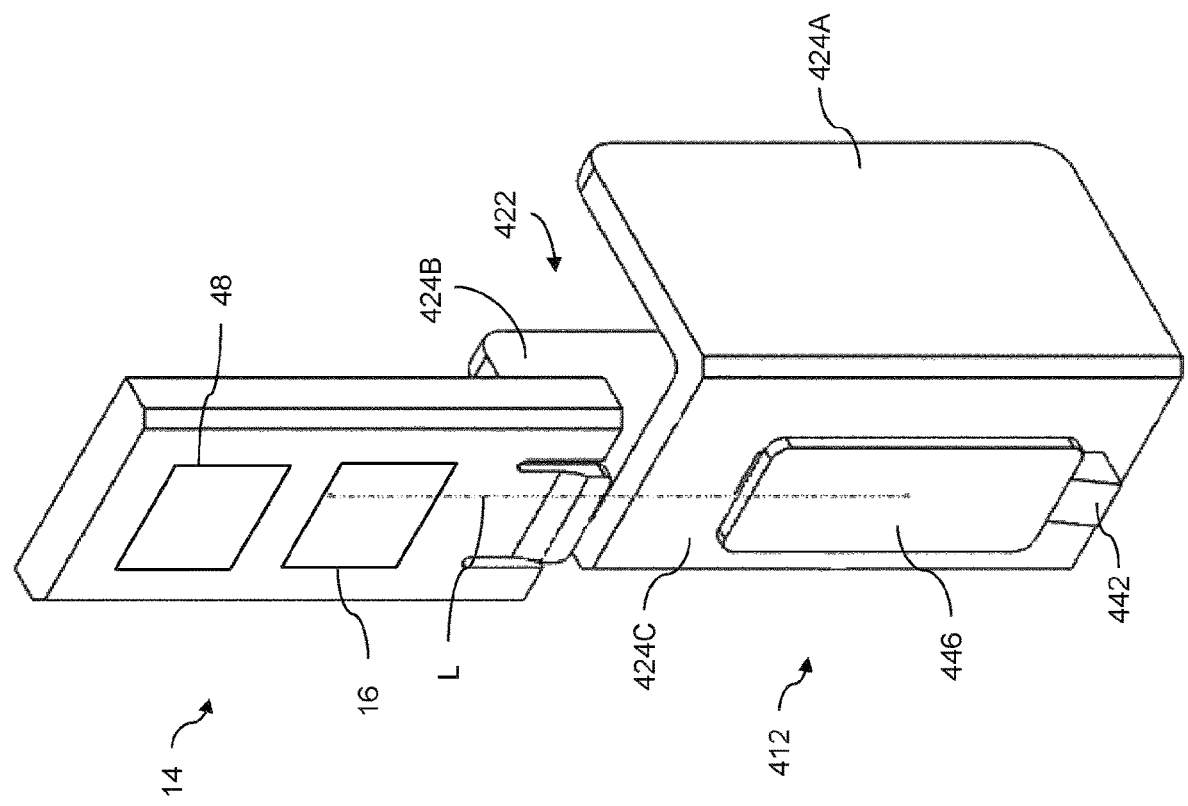
FIG. 31 is a perspective view showing an exemplary accessory clip separated from the bracket of FIG. 27.

FIG. 31 is a perspective view showing accessory clip 14 separated from bracket 412. Mounting interface 16 and optional window 48 are shown schematically in FIG. 31. When assembling accessory clip 14 to bracket 412, accessory clip 14 may be oriented as shown and moved toward bracket 412 along line L (or alternatively, bracket 412 may be oriented as shown and moved toward accessory clip 14 along line L) in order to cause engagement of anchor 446 with cooperating slot 44 (shown in FIG. 9).

Figure 32A:
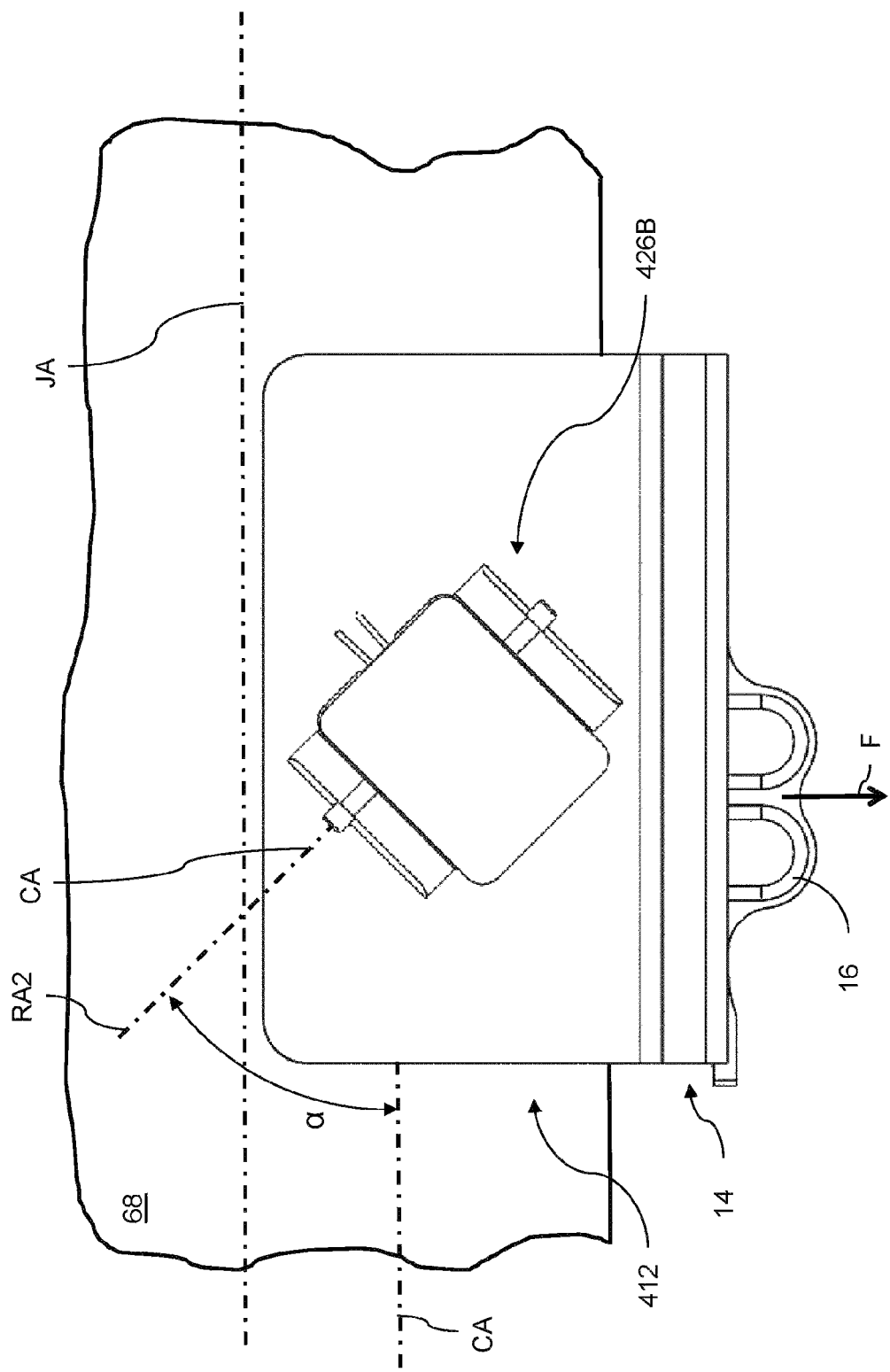
FIG. 32A is left side view of the bracket of FIG. 27 attached to a ceiling joist.

FIG. 32A is a left side view of bracket 412 attached to a horizontal elongated member such as ceiling joist 68. Ceiling joist 68 may be part of an unfinished ceiling and have a longitudinal joist axis JA that is substantially horizontal. In the installed position shown in FIG. 32A, channel axis CA may be substantially parallel to joist axis JA. In various embodiments, rotation axis RA2 of cam 426B may be parallel to or non-parallel to channel axis CA and/or to joist axis JA. In some embodiments, rotation axis RA2 may be oblique to channel axis CA so that a suitable clamping force may be generated via cam 426B when bracket 412 is installed to horizontal ceiling joist 68. FIG. 32A shows vertical force F that would be applied to bracket 412 during use and which would generate the suitable clamping force onto ceiling joist 68 as explained above.

Figure 32B:
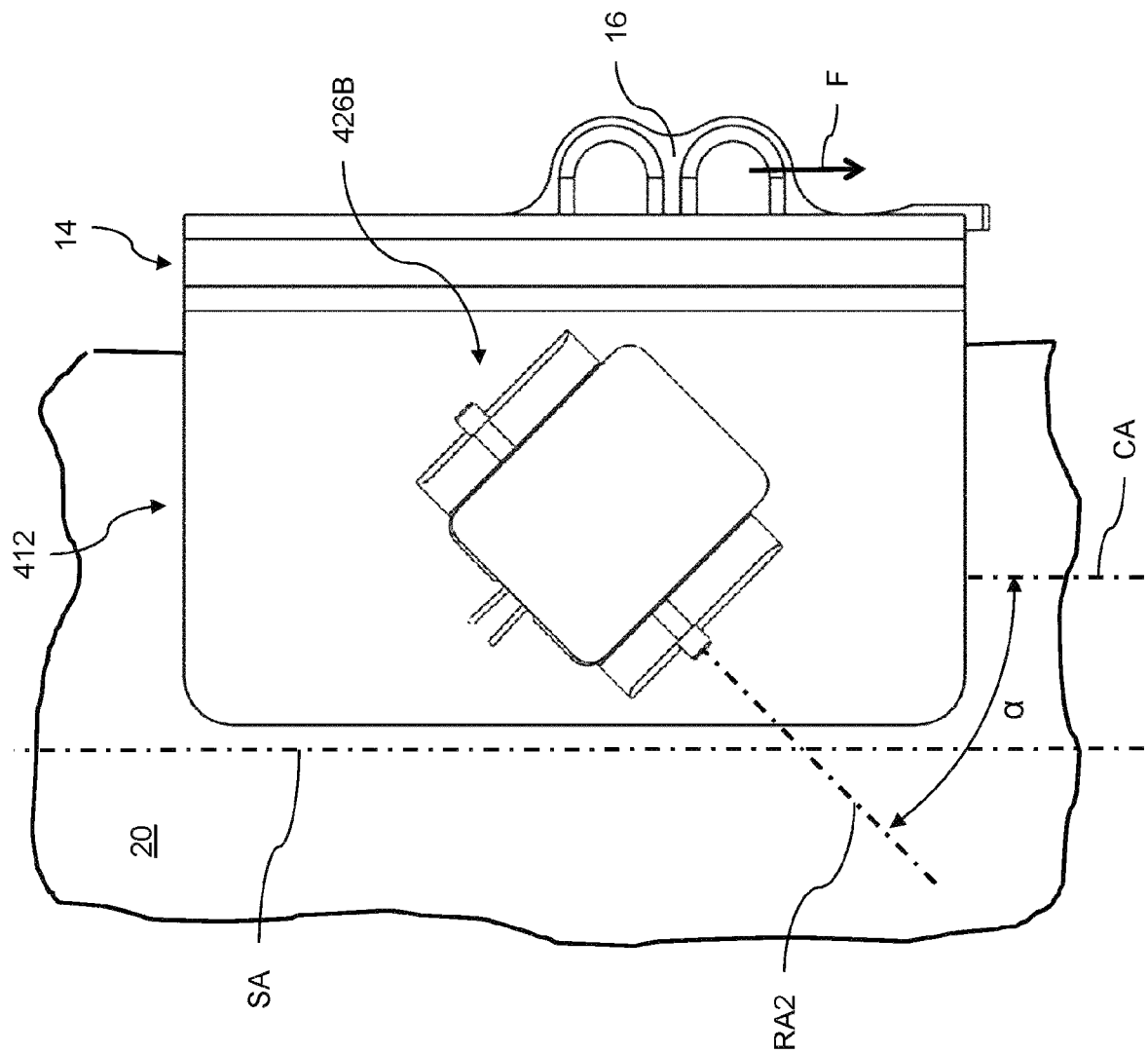
FIG. 32B is left side view of the bracket of FIG. 27 attached to a wall stud.

FIG. 32B is a left side view of the bracket 412 attached to vertical wall stud 20. In the installed position shown in FIG. 32A, channel axis CA may be substantially parallel to stud axis SA. In some embodiments, rotation axis RA2 of cam 426B may be oblique to channel axis CA so that a suitable clamping force may be generated via cam 426B when bracket 412 is installed to vertical wall stud 20. FIG. 32B shows vertical force F that would be applied to bracket 412 during use and which would generate the suitable clamping force onto wall stud 20 as explained above.

In various embodiments of bracket 412, angle α between rotation axis RA2 and channel axis CA in the plane of FIGS. 32A and 32B may be 0 degree (i.e., rotation axis RA2 and channel axis CA being parallel), 90 degrees (i.e., rotation axis RA2 and channel axis CA being perpendicular), or any angle between 0 and 90 degrees. In some embodiments, angle α between rotation axis RA2 and channel axis CA may be between 25 and 65 degrees. In some embodiments, angle α between rotation axis RA2 and channel axis CA may be between 27 and 45 degrees. In some embodiments, angle α between rotation axis RA2 and channel axis CA may be between 40 and 50 degrees. In some embodiments, angle α between rotation axis RA2 and channel axis CA may be about 45 degrees.

Figure 33:
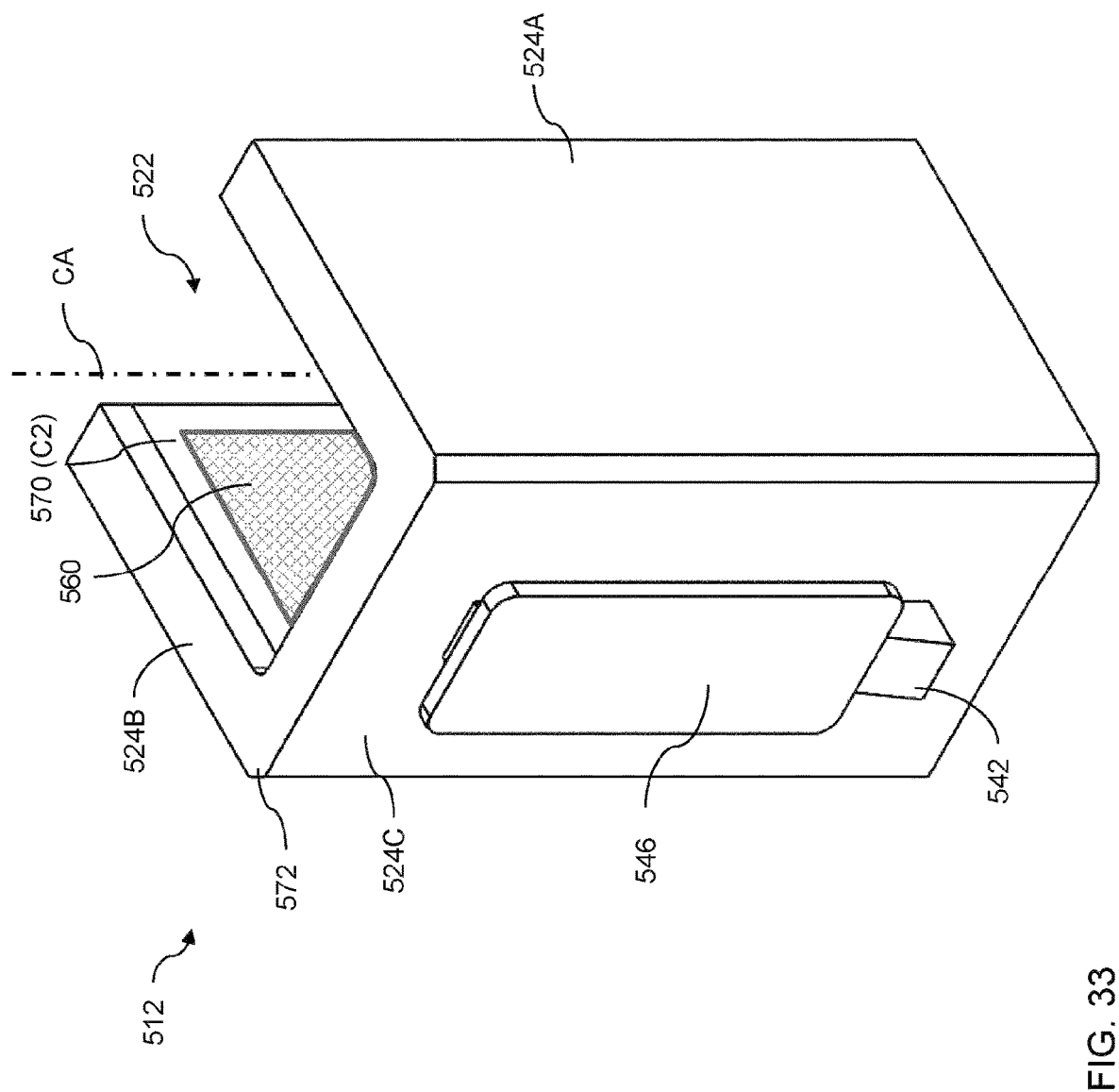
FIG. 33 is a perspective view of another exemplary bracket of the mount.

FIG. 33 is a perspective view of another exemplary bracket 512 according to another embodiment. Bracket 512 may be attachable to vertical wall stud 20, horizontal ceiling joist 68 and/or an elongated member at some other orientation. Some aspects of bracket 512 may be generally identical to those of bracket 12 described above and like elements have been identified using like reference numerals that have been incremented by 500. Bracket 512 may include insert 570 defining an insert receptacle (e.g., channel 522) for receiving an elongated member therein. Bracket 512 may also include sleeve 572 defining a sleeve receptacle for receiving the insert 570 therein. Insert 570 may be removably insertable into sleeve 572. FIG. 33 shows insert 570 being fully inserted into sleeve 572. Together, sleeve 572 and insert 570 may cooperatively define a shape that is similar to base 18 of bracket 12. Bracket 512 may include first wall 524A, second wall 524B and third wall 524C. Bracket 512 may also include anchor 546 for engagement with cooperating slot 44 (shown in FIG. 9) of accessory clip 14. Bracket 512 may also include boss 542. Insert 570 may also include friction-enhancing surface(s) 560 disposed on one or more channel-facing sides of insert 570.

Figure 34:
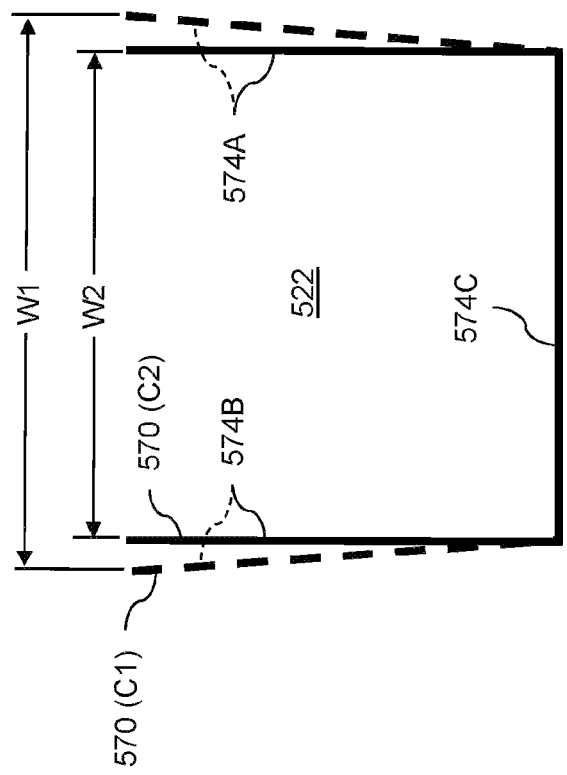
FIG. 34 is a schematic top plan view of an insert of the bracket of FIG. 33 illustrating two configurations of the insert.

FIG. 34 is a schematic top plan view of insert 570 of bracket 512 illustrating two configurations of insert 570. Insert 570 may be configurable between a released configuration C1 (shown in broken lines) and an engaged configuration C2 (shown in solid lines) to respectively release and frictionally engage the elongated member (e.g., wall stud 20 or ceiling joist 68) received in channel 522. Insert 570 may include first wall 574A, second wall 574B and third wall 574C each having an inner surface partially defining channel 522. First wall 574A and second wall 574B may face each other and be spaced apart from each other. Third wall 574C may interconnect first wall 574A and second wall 574B.

Insert 570 may be biased toward the released configuration C1 so that when insert 570 is outside of sleeve 572, insert 570 may automatically adopt the released configuration C1 where an opening of channel 522 may have an enlarged width W1 that is adapted to allow the elongated member to be freely received into and removed from channel 522. Alternatively, when insert 570 is inserted into sleeve 572, first and second walls 574A, 574B of insert 570 may be urged toward each other to define the engaged configuration C2 where the opening of channel 522 may have a reduce width W2. The bringing together of first and second walls 574A and 574B may also apply a clamping force onto the elongated member inserted in channel 522. The transitions of insert 570 between the released configuration C1 and the engaged configuration C2 may be achieved by flexing (e.g., elastically deforming) insert 570 by the engagement of sleeve 572 with insert 570.

Figure 35:
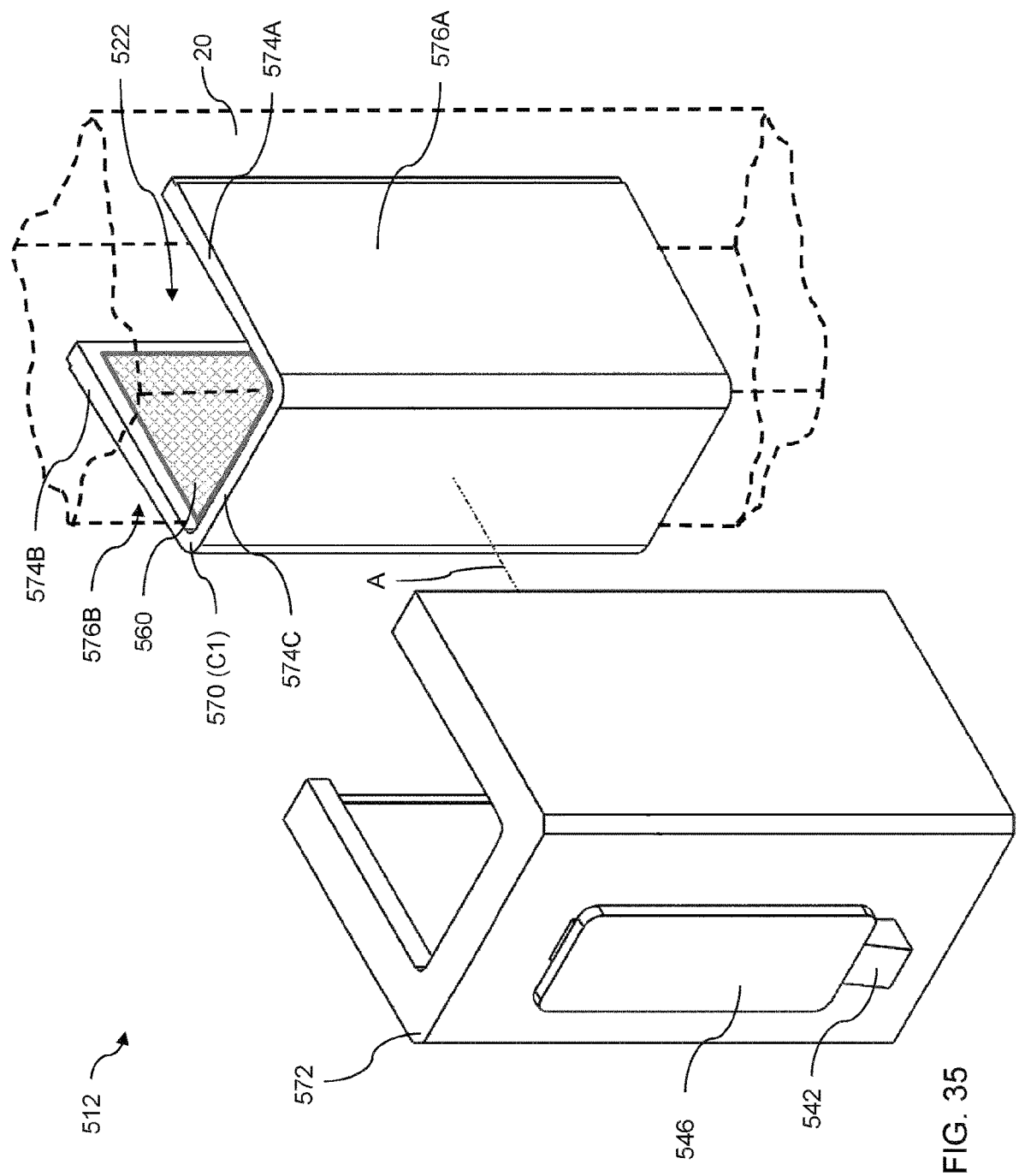
FIG. 35 is a perspective exploded view of the bracket of FIG. 33.

FIG. 35 is a perspective exploded view of bracket 512 illustrating the installation of bracket 512 onto wall stud 20. Wall stud 20 is shown in broken lines and transparent for the purpose of illustrating the installation procedure. As shown in FIG. 35, insert 570 may be removed from sleeve 572 to adopt the released configuration C1 and then positioned so that wall stud 20 is received into channel 522. Sleeve 572 may then be disposed over insert 570 by movement of sleeve 572 toward insert 570 along line A. As explained below, the engagement of sleeve 572 with insert 570 may urge insert 570 toward the engaged configuration C1 in order to apply the clamping force onto wall stud 20. Any suitable storage component may be attached to bracket 572 via anchor 546 and optionally accessory clip 14.

FIG. 36A is a top plan view of bracket 572. FIG. 36B is an enlarged top view of a portion of bracket 572. Bracket 572 may be substantially U-shaped. In reference to FIGS. 34-36B, the insertion of insert 570 into sleeve 572 or the placement of sleeve 572 over insert 570 may cause insert 570 to flex from the released configuration C1 toward the engaged configuration C2. A receptacle defined by sleeve 572 may be sized to define an interference fit between sleeve 572 and insert 570 so that as insert 570 is inserted into sleeve 572, sleeve 572 urges insert 570 toward the engaged configuration C2.

First wall 574A of insert 570 may have first outer surface 576A opposite channel 522. Second wall 574B of insert 570 may have second outer surface 576B opposite channel 522. First outer surface 576A and second outer surface 576B may cooperatively define a cuneiform (wedge-shaped) interface in the plane of FIG. 36A (e.g., see also the released configuration C1 in FIG. 34) for engagement with sleeve 572. The cuneiform interface may be defined by distal portions (distal to third wall 574C) of outer surfaces 576A, 576B being farther apart from each other than proximal portions (proximal to third wall 574C) of outer surfaces 576A, 576B.

In reference to FIGS. 36A and 36B, sleeve 572 may include opposite protrusions 578A, 578B that are configured to interface (e.g., contact and slide across) corresponding outer surfaces 576A, 576B of first and second walls 574A and 574B of insert 570 when insert 570 is inserted into sleeve 572. As insert 570 is progressively inserted into sleeve 572, protrusions 578A, 578B urge respective first and second walls 574A and 574B toward the engaged configuration C2 of insert 570 due to the cuneiform shape cooperatively defined by outer surfaces 576A, 576B.

In some embodiments, insert 570 may also include recesses 580A, 580B that are positioned and configured to receive respective protrusions 578A, 578B of sleeve 572 when insert 570 is fully inserted into sleeve 572. The engagement of protrusions 578A, 578B with respective recesses 580A, 580B may serve to interlock insert 570 and sleeve 572 together when bracket 512 is installed onto the elongated member (e.g., wall stud 20 or ceiling joist 68).

The removal of bracket 512 from the elongated member may be performed by manually flexing sleeve 572 to disengage protrusions 578A, 578B of sleeve 572 from recesses 580A, 580B of insert 570 and withdrawing sleeve 572 from insert 570. The withdrawal of sleeve 572 from insert 570 may cause the insert 570 to automatically flex back toward the released configuration C1 and thereby cause the clamping force on the elongated member to be reduced or removed to permit removal of insert 570 from the elongated member.

Figure 37:
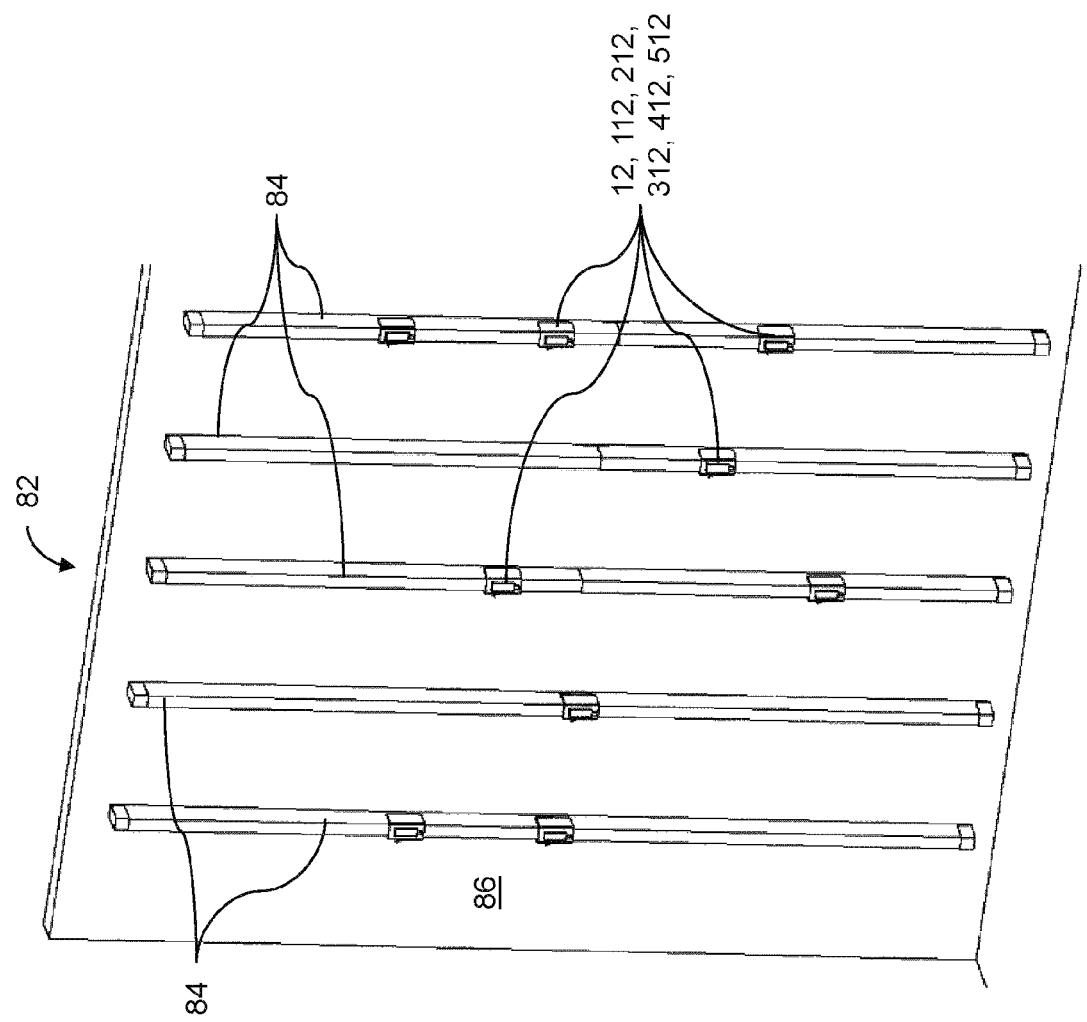
FIG. 37 is a perspective view of an exemplary track system and brackets as described herein.

FIG. 37 is a perspective view of track system 82 for use with one or more brackets 12, 112, 212, 312, 412, 512 of a type as described herein. Track system 82 may include one or more elongated members such as tracks 84 that may be attached to wall 86 or to a ceiling. For example, tracks 84 may be fastened to a wallboard of wall 86 for the purpose of installing an organizational system on a finished wall 86. Track system 82 may include a plurality of tracks 84 that are mounted in a parallel fashion to wall 86 to mimic an arrangement of wall studs 20 for example. One or more brackets 12, 112, 212, 312, 412, 512 may be attached to one or more tracks 84.

Figure 38:
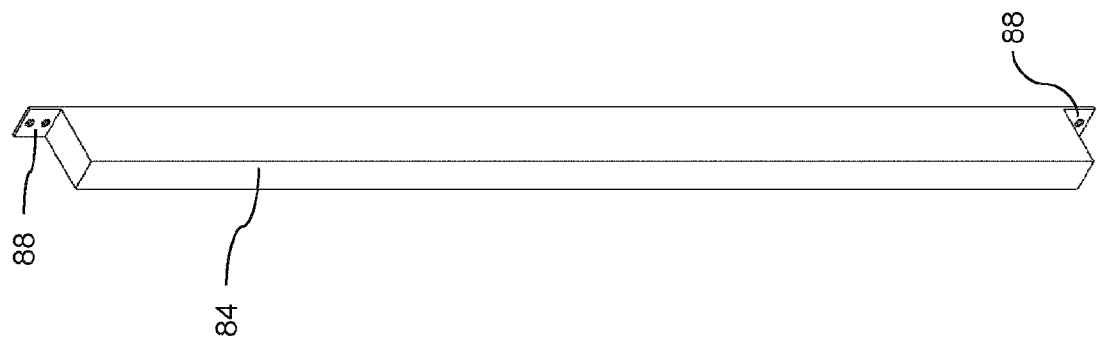
FIG. 38 is a perspective view of an exemplary track of the track system of FIG. 37.

FIG. 38 is a perspective view of an exemplary track 84 of track system 82 of FIG. 37. Track 84 may be linear/straight and have a rectangular cross-sectional profile. In some embodiments, the rectangular cross-sectional profile of track 84 may be dimensioned to have a substantially identical width as a conventional wall stud or ceiling joist for example, to permit the same brackets 12, 112, 212, 312, 412, 512 to be attachable to track 84 and also to wall studs and/or ceiling joists.

Track 84 may include one or more tabs 86 with one or more fastener holes therethrough to permit the attachment of track 84 to wall 86 or to a ceiling using suitable screws for example. Track 84 may be made from wood, metal and/or from plastic for example.

With respect to the various embodiments of brackets described herein, it is understood that elements of the different embodiments may be combined in any suitable combinations. It is also understood that organizational systems that make use of multiple mounts 10 can be implemented using mounts that are all of the same type or that are of different types.

The components of the organizational systems described herein may be made using known or other materials and manufacturing processes. For example, the bases and cams of brackets, and the accessory clips may be made of a suitable (e.g., thermoplastic or thermosetting) polymer by injection molding, from a fiber-reinforced polymer, or from a metallic material (e.g., steel, aluminum) by die casting or (e.g., sheet) metal forming for example. Pivot pins 28A, 28B may also be made from a suitable polymer or may be made from a suitable metallic material such as (e.g., stainless) steel for example. Torsion springs 34A, 34B may be made from a metallic material. Other storage components described herein may also be made from suitable (e.g., fiber-reinforced) polymeric or metallic materials using known or other manufacturing processes.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. The present disclosure is intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. An organizational system bracket for attachment to an elongated member, the organizational system bracket comprising:
   a first wall;
   a second wall facing the first wall and spaced apart from the first wall;
   a third wall interconnecting the first and second walls, the first, second and third walls cooperatively defining a channel for receiving the elongated member, the third wall including an interface for releasable attachment of a storage component to the bracket, the interface including an anchor protruding from the third wall and configured to be slidingly received and releasably retained in a cooperating slot having a T-shaped cross-sectional profile formed on the storage component;
   a clamp foot movably coupled to the first wall, the clamp foot being translatable between an engaged position and a released position to respectively engage and release the elongated member received in the channel; and
   a rotatable knob drivingly coupled to the clamp foot via a threaded stem,
   wherein:
      the threaded stem extends through the first wall and is threadably engaged with a nut attached to the first wall;
      the rotatable knob is in torque-transmitting engagement with the stem via a torque limiter;
      the clamp foot is coupled to the threaded stem via a swivel connection; the channel extends along a channel axis; and
      a length of the first wall along the channel axis is greater than a distance between the first and second walls.

2. The organizational system bracket as defined in claim 1, wherein the rotatable knob is drivingly coupled to the clamp foot to cause translation of the clamp foot.

3. The organizational system bracket as defined in claim 2, wherein the rotatable knob has a rotation axis that is substantially parallel to a translation direction of the clamp foot.

4. The organizational system bracket as defined in claim 1, wherein the clamp foot includes a friction-enhancing foot surface for engagement with the elongated member.

5. The organizational system bracket as defined in claim 1, wherein the second wall includes a friction-enhancing wall surface for engagement with the elongated member.

6. An organizational system for attachment to a wall, the organizational system comprising:
   a track attachable to the wall;
   a bracket attachable to the track, the bracket including an anchor protruding from a wall of the bracket; and
   an accessory clip attachable to the bracket, the accessory clip including:
      a storage component; and
      a slot having a T-shaped cross-sectional profile and configured to slidingly receive and releasably retain the anchor therein,
   wherein:
      the bracket is a first bracket and the anchor is a first anchor;
      the organizational system includes a second bracket attachable the track;
      the second bracket includes a second anchor protruding from a wall of the second bracket;

the accessory clip is a first accessory clip attachable to the first bracket;

the organizational system includes a second accessory clip attachable to the second bracket; and the storage component is configured to be supported by the first accessory clip and the second accessory clip.

7. The organizational system as defined in claim 6, wherein the track includes one or more fastener holes therethrough to permit attachment of the track to the wall using one or more screws.

8. The organizational system as defined in claim 6, wherein the track includes a tab extending axially from an end of the track.

9. The organizational system as defined in claim 6, wherein the storage component includes a shelf.

10. The organizational system as defined in claim 6, wherein the bracket is attachable to the track via a surface movable between an engaged position and a released position to respectively engage and release the track, the surface being biased toward the engaged position by a spring.

11. The organizational system as defined in claim 6, wherein the bracket defines a channel for receiving the track therein.

12. The organizational system as defined in claim 6, wherein:

the slot is configured to slidingly receive the anchor by movement of the accessory clip along a line relative to the bracket; and a size of the anchor along the line is greater than a size of the anchor transverse to the line.

* * * * *